United States Patent
Wang et al.

(10) Patent No.: US 10,291,971 B2
(45) Date of Patent: May 14, 2019

(54) OPTICAL CROSS-CONNECT NODE AND OPTICAL SIGNAL SWITCHING METHOD

(71) Applicant: Huawei Technologies Co., Ltd., Shenzhen (CN)

(72) Inventors: Dawei Wang, Munich (DE); Yi Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/728,751

(22) Filed: Oct. 10, 2017

(65) Prior Publication Data

US 2018/0035182 A1    Feb. 1, 2018

Related U.S. Application Data

(63) Continuation of application No. PCT/CN2015/076426, filed on Apr. 13, 2015.

(51) Int. Cl.
*H04J 14/00*    (2006.01)
*H04Q 11/00*    (2006.01)

(52) U.S. Cl.
CPC .......... *H04Q 11/0005* (2013.01); *H04J 14/00* (2013.01); *H04Q 2011/0016* (2013.01); *H04Q 2011/0049* (2013.01)

(58) Field of Classification Search
CPC ................. H04J 14/00; H04Q 11/0005; H04Q 2011/0016; H04Q 2011/0049
(Continued)

(56) References Cited

U.S. PATENT DOCUMENTS 5,878,177 A * 3/1999 Karasan ............. H04Q 11/0001
                                                                                        385/17
6,842,554 B2 * 1/2005 Nishi ................. H04J 14/0209
                                                                                        385/17

(Continued)

FOREIGN PATENT DOCUMENTS

CN           2653792 Y      11/2004
CN         201138412 Y      10/2008
(Continued)

OTHER PUBLICATIONS

Foreign Communication From a Counterpart Application, European Application No. 15888758.8, Extended European Search Report dated Mar. 26, 2018, 5 pages.
(Continued)

*Primary Examiner* — Amritbir K Sandhu
(74) *Attorney, Agent, or Firm* — Conley Rose, P.C.

(57) ABSTRACT

An optical cross-connect node includes a first optical switching switch, a second optical switching switch, a wave-dropping wavelength switching switch, a wave-adding wavelength switching switch, and a pass-through dimension switching switch. The first optical switching switch receives an optical signal, where the optical signal includes a first optical signal and/or a second optical signal. The first optical switching switch sends the first optical signal to the wave-dropping wavelength switching switch. The first optical switching switch sends the second optical signal to the pass-through dimension switching switch. The wave-dropping wavelength switching switch performs wavelength switching on the first optical signal. The wave-adding wavelength switching switch performs wavelength switching on a third optical signal generated locally and sends it to the second optical switching switch. The pass-through dimension switching switch performs dimension switching on the (Continued)

second optical signal and sends, to the second optical switching switch, the second optical signal that has undergone dimension switching.

16 Claims, 11 Drawing Sheets

(58) Field of Classification Search
USPC .............................................. 398/43, 45, 50
See application file for complete search history.

(56) References Cited

U.S. PATENT DOCUMENTS

| | | | | |
|---|---|---|---|---|
| 7,933,519 | B2* | 4/2011 | Akiyama | H04J 14/0209 398/48 |
| 8,639,069 | B1* | 1/2014 | Helkey | H04Q 11/0005 385/16 |
| 9,048,974 | B2* | 6/2015 | Wisseman | H04J 14/0204 |
| 9,788,089 | B2* | 10/2017 | Sato | H04J 14/0212 |
| 9,800,959 | B2* | 10/2017 | Zhang | H04J 14/02 |
| 2002/0030867 | A1 | 3/2002 | Iannone | H04J 14/0295 398/49 |
| 2003/0118274 | A1* | 6/2003 | Nishi | H04J 14/0291 385/17 |
| 2003/0185565 | A1* | 10/2003 | Wang | H04J 14/0212 398/49 |
| 2003/0206684 | A1* | 11/2003 | Nishi | H04J 14/0209 385/17 |
| 2004/0057726 | A1* | 3/2004 | Penninckx | H04Q 11/0005 398/50 |
| 2006/0098981 | A1* | 5/2006 | Miura | H04J 14/0209 398/45 |
| 2008/0056715 | A1* | 3/2008 | Akiyama | H04J 14/0209 398/45 |
| 2009/0041457 | A1* | 2/2009 | Maki | H04J 14/0204 398/45 |
| 2009/0208203 | A1* | 8/2009 | Chiu | H04J 14/0246 398/16 |
| 2010/0014863 | A1* | 1/2010 | Zami | H04J 14/0204 398/79 |
| 2011/0217038 | A1 | 9/2011 | Zhang et al. | |
| 2015/0063804 | A1 | 3/2015 | Lee et al. | |
| 2016/0142797 | A1* | 5/2016 | Sato | H04J 14/0212 398/50 |
| 2016/0309243 | A1* | 10/2016 | Zhang | H04J 14/02 |
| 2018/0035182 | A1* | 2/2018 | Wang | H04J 14/00 |

FOREIGN PATENT DOCUMENTS

| | | |
|---|---|---|
| CN | 101742363 A | 6/2010 |
| CN | 101919189 A | 12/2010 |
| CN | 201733410 U | 2/2011 |
| CN | 102696194 A | 9/2012 |
| CN | 102783066 A | 11/2012 |
| JP | 2010081374 A | 4/2010 |
| WO | 2010036264 A1 | 4/2010 |
| WO | 2012025148 A1 | 3/2012 |
| WO | 2013149660 A1 | 10/2013 |

OTHER PUBLICATIONS

Machine Translation and Abstract of Chinese Publication No. CN102696194, Sep. 26, 2012, 32 pages.
Machine Translation and Abstract of Chinese Publication No. CN201138412, Oct. 22, 2008, 8 pages.
Machine Translation and Abstract of Chinese Publication No. CN201733410, Feb. 2, 2011, 11 pages.
Machine Translation and Abstract of Japanese Publication No. JP2010081374, Apr. 8, 2010, 20 pages.
Foreign Communication From a Counterpart Application, PCT Application No. PCT/CN2015/076426, English Translation of International Search Report dated Jan. 12, 2016, 2 pages.
Foreign Communication From a Counterpart Application, PCT Application No. PCT/CN2015/076426, English Translation of Written Opinion dated Jan. 12, 2016, 6 pages.
Machine Translation and Abstract of Chinese Publication No. CN2653792, Nov. 3, 2004, 9 pages.
Foreign Communication From a Counterpart Application, Chinese Application No. 201580077722.X, Chinese Office Action dated Jun. 27, 2018, 5 pages.

* cited by examiner

OPTICAL CROSS-CONNECT NODE AND OPTICAL SIGNAL SWITCHING METHOD

CROSS-REFERENCE TO RELATED APPLICATIONS

This application is a continuation of International Application No. PCT/CN2015/076426, filed on Apr. 13, 2015, the disclosure of which is hereby incorporated by reference in its entirety.

TECHNICAL FIELD

Embodiments of the present disclosure relate to the field of optical communications technologies, and more specifically, to an optical cross-connect node and an optical signal switching method.

BACKGROUND

With rapid development of an Internet service and a multimedia application, a service volume of a network is rapidly expanding at an exponential rate. Therefore, the network is required to have a high bit rate data transmission capability and a large throughput cross capability. Therefore, a fiber optical communications technology starts to penetrate to a communications network. In addition, because an optical signal of an all optical network (AON) always exists in an optical form during transmission and switching in the network without undergoing optical-to-electrical conversion and electrical-to-optical conversion, fiber optic communications is being comprehensively pulled to the all optical network.

Optical cross-connect (OXC) is an important link in the all optical network. Main functions of an OXC node include switching between dimensions, switching between wavelengths in a dimension, wave adding/dropping on a local wavelength, and the like. A wavelength in the switching between dimensions or in the switching between wavelengths in a dimension is referred to as a pass-through wave. Adding a local wavelength to a dimension is referred to as wave adding, and dropping a wavelength of a dimension to a local node is referred to as wave dropping. Requirements of a network for the OXC node are as follows: a large switching capacity, being transparent to a wavelength and a data format, a low blocking rate, low power consumption, a high integration level, low costs, and the like. A key part of the OXC node, that is an optical switching apparatus such as an optical switch, is mainly used for optical signal switching, that is, outputs an input signal from a corresponding output port according to a routing-configured mapping relationship.

In an existing OXC node based on the optical switching apparatus, an optical switch for wavelength switching is shared by wave dropping performed on a wavelength of another network node and wave adding performed on a wavelength of a local node. A pass-through wave may spare an idle port for wave adding only when wave dropping is performed, and wave adding and wave dropping may be performed on signals of a same wavelength on the optical switch at the same time. Therefore, the same wavelength may bring crosstalk.

SUMMARY

Embodiments of the present disclosure provide an optical cross-connect node and an optical signal switching method, which can reduce crosstalk in an optical cross-connect node.

According to a first aspect, an optical cross-connect node is provided, and the node includes a first optical switching switch, a second optical switching switch, a wave-dropping wavelength switching switch, a wave-adding wavelength switching switch, and a pass-through dimension switching switch, where the first optical switching switch is configured to receive an optical signal, where the optical signal includes a first optical signal and/or a second optical signal, send the first optical signal to the wave-dropping wavelength switching switch, and send the second optical signal to the pass-through dimension switching switch; the wave-dropping wavelength switching switch is configured to perform wavelength switching on the first optical signal from the first optical switching switch; the wave-adding wavelength switching switch is configured to perform wavelength switching on a third optical signal generated locally, and send, to the second optical switching switch, the third optical signal that has undergone wavelength switching performed by the wave-adding wavelength switching switch; the pass-through dimension switching switch is configured to perform dimension switching on the second optical signal from the first optical switching switch, and send, to the second optical switching switch, the second optical signal that has undergone dimension switching; and the second optical switching switch is configured to receive and send the second optical signal from the pass-through dimension switching switch and the third optical signal from the wave-adding wavelength switching switch.

According to a second aspect, an optical signal switching method is provided, and a node applied to the method includes a first optical switching switch, a second optical switching switch, a wave-dropping wavelength switching switch, a wave-adding wavelength switching switch, and a pass-through dimension switching switch, and the method includes receiving, by the first optical switching switch, an optical signal, where the optical signal includes a first optical signal and/or a second optical signal, sending the first optical signal to the wave-dropping wavelength switching switch, and sending the second optical signal to the pass-through dimension switching switch; performing, by the wave-dropping wavelength switching switch, wavelength switching on the first optical signal from the first optical switching switch; performing, by the wave-adding wavelength switching switch, wavelength switching on a third optical signal generated locally, and sending, to the second optical switching switch, the third optical signal that has undergone wavelength switching performed by the wave-adding wavelength switching switch; performing, by the pass-through dimension switching switch, dimension switching on the second optical signal from the first optical switching switch, and sending, to the second optical switching switch, the second optical signal that has undergone dimension switching; and receiving and sending, by the second optical switching switch, the second optical signal from the pass-through dimension switching switch and the third optical signal from the wave-adding wavelength switching switch.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, an optical switching apparatus in the embodiments of the present disclosure may be applied to various optical networks, including a passive optical network (PON), such as a gigabit-capable passive optical network (GPON) system, a 10 G bit/s Ethernet passive optical network (10 G EPON), and a 10-gigabit-capable passive optical network (XG PON), and the like. In addition, from a perspective of a multiplexing technology, the optical switching apparatus in the embodiments of the present disclosure may be applied to an orbital angular momentum (OAM) network, and may also be applied to a non-OAM network, such as a wavelength division multiplexing (WDM) network.

At present, there are mainly three types of optical switching apparatuses applied to the WDM network. One is an optical switch that is of a 3-dimensional micro-electromechanical system (3D-MEMS) and that is based on a micromirror reflective technology. One is an optical switch that is of a reconfigurable optical add/drop multiplexer (ROADM) and that is based on a wavelength selective switch (WSS). Another frequently-used optical switching apparatus is an optical switch based on a cross-bar structure. It should be understood that an OXC node in the embodiments of the present disclosure may be the optical switch based on a cross-bar structure.

Figure 1:
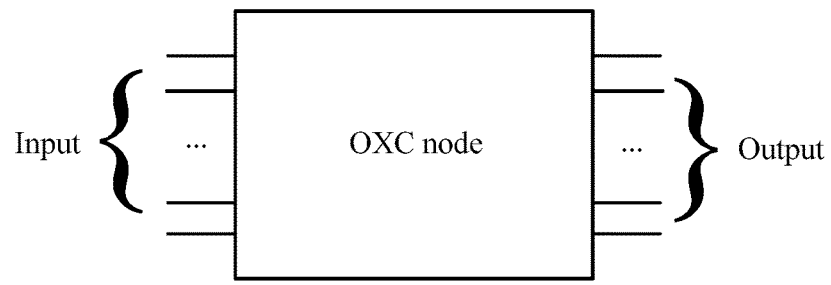
FIG. 1 is a schematic block diagram of an OXC node.

FIG. 1 is a schematic block diagram of an OXC node.

A quantity of dimensions of the OXC node may be corresponding to a quantity of ports of the OXC node, or may be corresponding to another optical node in a network. The OXC node shown in FIG. 1 may be an N×M optical switch, that is, may have N input dimensions and M output dimensions.

The optical node may be used for dimension switching, for example, after passing through an OXC optical switch, an optical signal of a first input dimension may be output from a third output dimension. An OXC node having five dimensions is used as an example. Input dimensions may include a first input dimension, a second input dimension, a third input dimension, a fourth input dimension, and a fifth input dimension. Output dimensions may include a first output dimension, a second output dimension, a third output dimension, a fourth output dimension, and a fifth output dimension. After passing through the OXC node, an optical signal of the first input dimension may be output from any one of the output dimensions.

A key part of the OXC node is an optical switch, and the optical switch is configured to switch an optical signal, that is, switch an input optical signal to a corresponding output port according to a routing-configured mapping relationship. Assuming that there are L wavelengths in each dimension, both a quantity of input ports and a quantity of output ports in one N-dimensional OXC node (that is, an OXC node having N dimensions) are N×L. N and L are positive integers.

Currently, there are mainly three types of available optical switches in an OXC node in an all optical network.

One is an optical switch that is of a 3D-MEMS and that is based on a micromirror reflective technology. The optical switch transmits, in parallel, input optical signals that are collimated by a collimator array to a micro-electro-mechanical system (MEMS) micromirror array. A micromirror of the MEMS micromirror array changes a direction under the control of a control signal, reflects incident light to a corresponding output port, and focuses the incident light to an output port array through a focus lens. Therefore, the optical switch that uses the 3D-MEMS and that is based on the micromirror reflective technology is a micro mechanical device, is easily affected by mechanical vibration, and needs extra vibration-reduction measures for reducing vibration.

One is an optical switch that is of a ROADM and that is based on a WSS. The optical switch generally includes many small WSS multiplexers/demultiplexers, and each WSS multiplexer/demultiplexer includes a WDM multiplexer/demultiplexer and many small WSS units. A principle of the WSS units is similar to that of an MEMS. An input optical signal is reflected to an output port by using a grating or a micromirror. Owning to a structure feature of the ROADM, the ROADM is easily upgraded to a switch in a larger scale, but costs are relatively high. Another disadvantage of the ROADM is that wavelength blocking easily occurs during wave adding/dropping. Another frequently-used optical switching apparatus is an optical switch based on a cross-bar structure. The optical switch based on a cross-bar structure generally includes small switch units. Each small switch unit has a 2×2 structure and has two statuses: a cross state in which output and input are in a cross state (input 1→output 2; input 2→output 1), and a bar state in which output and input are in a bar state (input 1→output 1; input 2→output 2). Each small switch unit may have only one input (1×2) and also have two statuses: a cross state in which output and input are in a cross state (input 1→output 2); and a bar state in which output and input are in a bar state (input 1→output 1). Each small switch unit may also have only one output (2×1) and also have two statuses: a cross state in which output and input are in a cross state (input 2→output 1); and a bar state in which output and input are in a bar state (input 1→output 1). Each small switch unit is generally based on a Mach-Zehnder (MZ) optical interference structure, and may implement large-scale integration by using a silicon photonics integration (SPI) technology. An integrated crossbar optical switch costs greatly less than the 3D-MEMS and ROADM technologies. Considering that integration development gradually appears in the optical communications industry, the crossbar optical switch is a best candidate for an OXC node in an all optical network.

Figure 2:
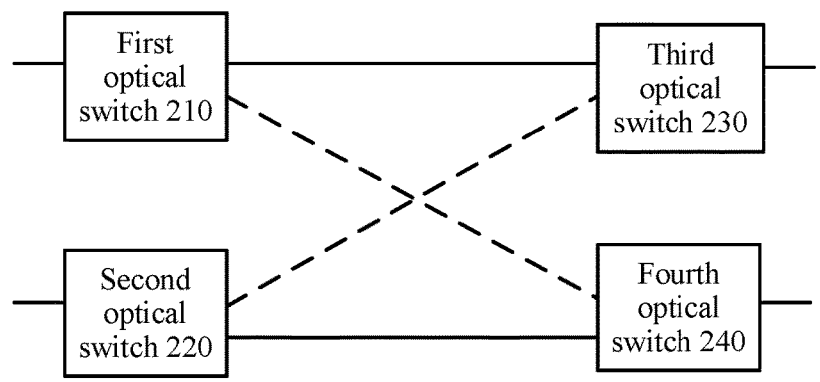
FIG. 2 is a schematic structural block diagram of an OXC node.

With reference to FIG. 2, the following describes a structure of an optical node.

FIG. 2 is a schematic structural block diagram of an OXC node. The OXC node shown in FIG. 2 includes a first optical switch 210, a second optical switch 220, a third optical switch 230, and a fourth optical switch 240. The first optical switch 210 is a 1×2 optical switch, including an input port, an upper output port, and a lower output port. The second optical switch 220 is a 1×2 optical switch, including an input port, an upper output port, and a lower output port. The third optical switch 230 is a 2×1 optical switch, including an upper input port, a lower input port, and an output port. The fourth optical switch 240 is a 2×1 optical switch, including an upper input port, a lower input port, and an output port.

A 1×2 switch indicates that one port may be selected from two output ports for output. A 2×1 switch indicates that one port may be selected from two input ports for input. In an example of FIG. 2, a solid line in FIG. 2 may be an active connection, for example, the upper output port of the first optical switch 210 is used as an output port. A dashed line in FIG. 2 may be an inactive connection, for example, no optical signal passes through the lower output port of the first optical switch 210.

In FIG. 2, the upper output port of the first optical switch 210 may be connected to the upper input port of the third optical switch 230, and the lower output port of the second optical switch 220 may be connected to the lower input port of the fourth optical switch 240. In this way, an optical signal input by the first optical switch 210 may be output from the output port of the third optical switch 230, and an optical signal input by the second optical switch 220 may be output from the output port of the fourth optical switch 240.

It should be understood that, in the OXC node shown in FIG. 2, the lower output port of the first optical switch 210 may be connected to the upper input port of the fourth optical switch 240, and the upper output port of the second optical switch 220 may be connected to the lower input port of the third optical switch 230. In an active state of this connection, the optical signal input by the first optical switch 210 may be output from the output port of the fourth optical switch 240, and the optical signal input by the second optical switch 220 may be output from the output port of the third optical switch 230.

Figure 3:
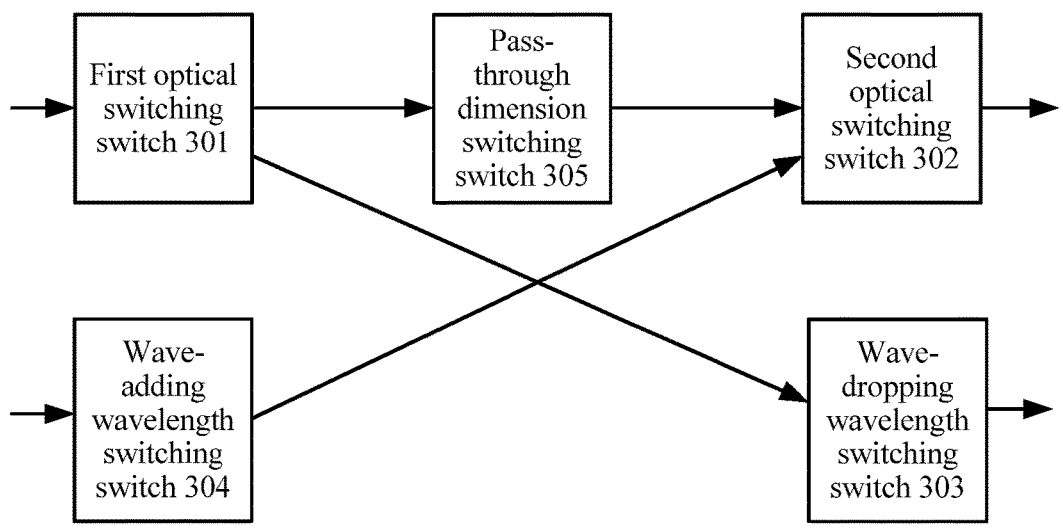
FIG. 3 is a schematic block diagram of an optical cross-connect node according to an embodiment of the present disclosure.

FIG. 3 is a schematic block diagram of an optical cross-connect node according to an embodiment of the present disclosure. An optical cross-connect node 300 shown in FIG. 3 may include a first optical switching switch 301, a second optical switching switch 302, a wave-dropping wavelength switching switch 303, a wave-adding wavelength switching switch 304, and a pass-through dimension switching switch 305.

The first optical switching switch 301 receives an optical signal, where the optical signal includes a first optical signal and/or a second optical signal, sends the first optical signal to the wave-dropping wavelength switching switch 303, and sends the second optical signal to the pass-through dimension switching switch 305.

The wave-dropping wavelength switching switch 303 performs wavelength switching on the first optical signal from the first optical switching switch 301.

The wave-adding wavelength switching switch 304 performs wavelength switching on a third optical signal generated locally, and sends, to the second optical switching switch 302, the third optical signal that has undergone wavelength switching performed by the wave-adding wavelength switching switch 304.

The pass-through dimension switching switch 305 performs dimension switching on the second optical signal from the first optical switching switch 301, and sends, to the second optical switching switch 302, the second optical signal that has undergone dimension switching.

The second optical switching switch 302 receives and sends the second optical signal from the pass-through dimension switching switch 305 and the third optical signal from the wave-adding wavelength switching switch 304.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

It should be understood that the first optical switching switch 301 and the second optical switching switch 302 may include at least one optical switch, and the optical switch may be a cross-bar optical switch. A quantity of optical switches included in the first optical switching switch 301 and the second optical switching switch 302 may be related to configurations and functions of the OXC node.

It should be further understood that in this embodiment of the present disclosure, the wave-adding wavelength switching switch 304, the wave-dropping wavelength switching switch 303, and the pass-through dimension switching switch 305 may include multiple optical switches of a cross-bar structure, for example, may include multiple 1×2 switches, 2×2 switches, and 2×1 switches. Different functions may be obtained according to different compositional structures, and include wavelength switching and dimension switching. The wavelength switching may be switching between different wavelengths in a same dimension, and the dimension switching may be switching of a same wavelength in different dimensions.

The wave-adding wavelength switching switch 304 may be applied to a wave adding process, and the wave-dropping wavelength switching switch 303 may be applied to a wave dropping process. The wave adding process is adding a wavelength of a local node to a dimension of a network, and the wave dropping process is dropping a wavelength of a dimension to the local node.

The first optical switching switch 301 may receive an optical signal from another node in the network. A first optical signal included in the received optical signal may be an optical signal whose wavelength needs to be dropped to local, and a second optical signal included in the received optical signal may be a pass-through wave on which wave adding or wave dropping does not need to be performed.

It should be understood that, after the third optical signal passes through the wave-adding wavelength switching switch, essence of the third optical signal remains unchanged, and only wavelengths that are of the third optical signal and that are in a same dimension are switched. In other words, the third optical signal that has passed through the wave-adding wavelength switch may be referred to as the third optical signal that has undergone wavelength switching performed by the wave-adding wavelength switching switch. The second optical signal from the pass-through dimension switching switch 305 may be the second optical signal that has undergone dimension switching performed by the pass-through dimension switching switch 305 after the second optical signal received by the first optical switching switch 301 is output to the pass-through dimension switching switch 305. The third optical signal from the wave-adding wavelength switching switch 304 may be the third optical signal obtained after the wave-adding wavelength switching switch 304 performs wavelength switching on the third optical signal generated locally.

Optionally, in another embodiment, a first output port of the first optical switching switch 301 may be connected to an input port of the pass-through dimension switching switch 305, a second output port of the first optical switching switch 301 may be connected to an input port of the wave-dropping wavelength switching switch 303, a first input port of the second optical switching switch 302 may be connected to an output port of the pass-through dimension switching switch 305, and a second input port of the second optical switching switch 302 may be connected to an output port of the wave-adding wavelength switching switch 304.

It should be understood that the pass-through dimension switching switch 305 in this embodiment of the present disclosure may include multiple optical switches of a cross-bar structure, for example, may include multiple 1×2 switches, 2×2 switches, and 2×1 switches. In this embodiment of the present disclosure, multiple groups of pass-through dimension switching switches 305 may be included, a quantity of switches included in each group of pass-through dimension switching switches 305 may depend on an OXC grouping situation. A relationship between the quantity of switches and a quantity of groups, a correspondence between the pass-through dimension switching switch 305 and a port of the first optical switching switch 301, and a correspondence between the pass-through dimension switching switch 305 and a port of the second optical switching switch 302 are described in detail in the following.

Optionally, in another embodiment, the optical cross-connect node in this embodiment of the present disclosure may further include another apparatus. For ease of understanding and description, the specification only describes content related to the present disclosure.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

Figure 4:
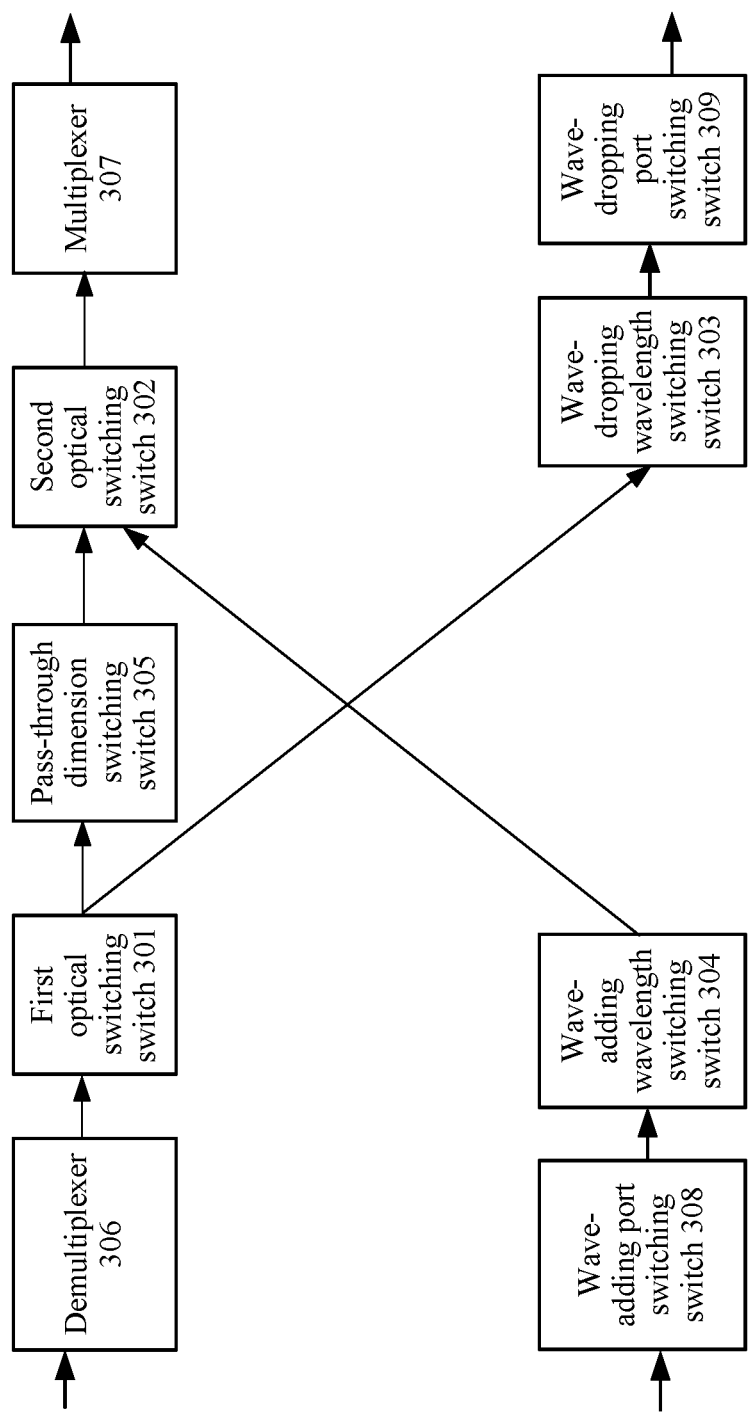
FIG. 4 is a schematic block diagram of an optical cross-connect node according to another embodiment of the present disclosure.

FIG. 4 is a schematic block diagram of an optical cross-connect node according to another embodiment of the present disclosure. It should be understood that an apparatus in FIG. 4 that is the same as that in FIG. 3 may use a same number. Another apparatus described above may include a demultiplexer 306, a multiplexer 307, a wave-adding port switching switch 308, and a wave-dropping port switching switch 309.

The demultiplexer 306 demultiplexes a wavelength division multiplexing signal from a network node, and sends the optical signal obtained after demultiplexing to the first optical switching switch 301, where an output port of the demultiplexer 306 is connected to an input port of the first optical switching switch 301.

The multiplexer 307 multiplexes a second optical signal from the second optical switching switch 302 and the third optical signal from the second optical switching switch 302 to obtain a wavelength division multiplexing signal, where an input port of the multiplexer 307 is connected to an output port of the second optical switching switch 302.

The wave-adding port switching switch 308 performs division and port switching on an optical signal generated locally to obtain the third optical signal, and sends the third optical signal to the wave-adding wavelength switching switch 304, where an output port of the wave-adding port switching switch 308 is connected to an input port of the wave-adding wavelength switching switch 304.

The wave-dropping port switching switch 309 performs division and port switching on the first optical signal that has undergone wavelength switching performed by a wave-dropping wavelength switching switch 303, where an input port of the wave-dropping port switching switch 309 is connected to an output port of the wave-dropping wavelength switching switch 303.

It should be understood that, the demultiplexer 306 may be a WDM demultiplexer, and the multiplexer 307 may be a WDM multiplexer. The optical signal obtained after demultiplexing performed by the demultiplexer 306 is transmitted to the first optical switching switch 301, and the optical signal obtained after demultiplexing may include the first optical signal and/or the second optical signal. The first optical signal is used for wave dropping, and the second optical signal is a pass-through wave. The wavelength division multiplexing signal is obtained after the second optical signal and the third optical signal output by the second optical switching switch 302 pass through the multiplexer 307, and the wavelength division multiplexing signal is finally transmitted to another node in a network.

As shown in FIG. 4, in a wave dropping process, multiple wavelengths may be output after the demultiplexer 306 demultiplexes an optical signal of a dimension from another node in the network. All of the multiple wavelengths may be dropped to a local node. Alternatively, some wavelengths may be dropped to a local node, and the other wavelengths are used as a pass-through wave to be sent to another network node. The output multiple wavelengths are the optical signal received by the first optical switching switch 301. A wavelength switching switch, such as the wave-dropping wavelength switching switch 303 in this embodiment of the present disclosure, may perform wavelength switching on wavelengths (that is, the first optical signal) that are to be dropped to local. The wave-dropping port switching switch 309 performs wave-dropping port switching on the wavelengths obtained after switching, and finally the wavelengths obtained after port switching are dropped to the local node.

In a wave adding process, the wave-adding port switching switch 308 may perform wave-adding port switching on the third optical signal from the local node. A wavelength switching switch, such as the wave-adding wavelength switching switch 304 in this embodiment of the present disclosure, performs wavelength switching on wavelengths obtained after port switching. The wavelengths obtained after wavelength switching are multiplexed by the multiplexer 307 and then output to an output port.

Optionally, in another embodiment, the first optical switching switch 301 may be a 1×2 switch.

The first optical switching switch 301 may include at least one 1×2 switch. A quantity of 1×2 switches may be related to a quantity of wavelengths of an optical signal and a grouping situation of the wavelengths. For the quantity of 1×2 switches included in the first optical switching switch 301, details are described in the following.

Optionally, in another embodiment, the second optical switching switch 302 may be a 2×1 switch.

The second optical switching switch 302 may include at least one 2×1 switch. A quantity of 2×1 switches may be related to a quantity of wavelengths of an optical signal and a grouping situation of the wavelengths. For the quantity of 2×1 switches included in the second optical switching switch 302, details are described in the following.

It should be understood that there may be multiple groups of wave-adding wavelength switching switches and multiple groups of wave-dropping wavelength switching switches in this embodiment of the present disclosure. Only one group of wave-adding wavelength switching switches and one group of wave-dropping wavelength switching switches are described in this embodiment of the present disclosure. A quantity of switches in each group of wave-adding wavelength switching switches depends on the OXC grouping situation. A quantity of input ports and a quantity of output ports of the wave-adding wavelength switching switch depend on a corresponding configuration. Similarly, there may be one group of demultiplexers 306, one group of multiplexers 307, one group of wave-adding port switching switches 308, and one group of wave-dropping port switching switches 309 shown in FIG. 4, and a quantity of switches in each group may be described in detail in the following. There may be multiple groups of first optical switching switch 301, multiple groups of second optical switching switches 302, multiple groups of add wave wavelength switching switches 304, multiple groups of drop wave wavelength switching switches 303, and multiple groups of pass-through dimension switching switches 305, and a quantity of groups and a quantity of switches in each group may be related to a grouping situation of wavelengths of each dimension. The following describes in detail the quantity of groups of the optical signals and the quantity of switches in each group.

Figure 5:
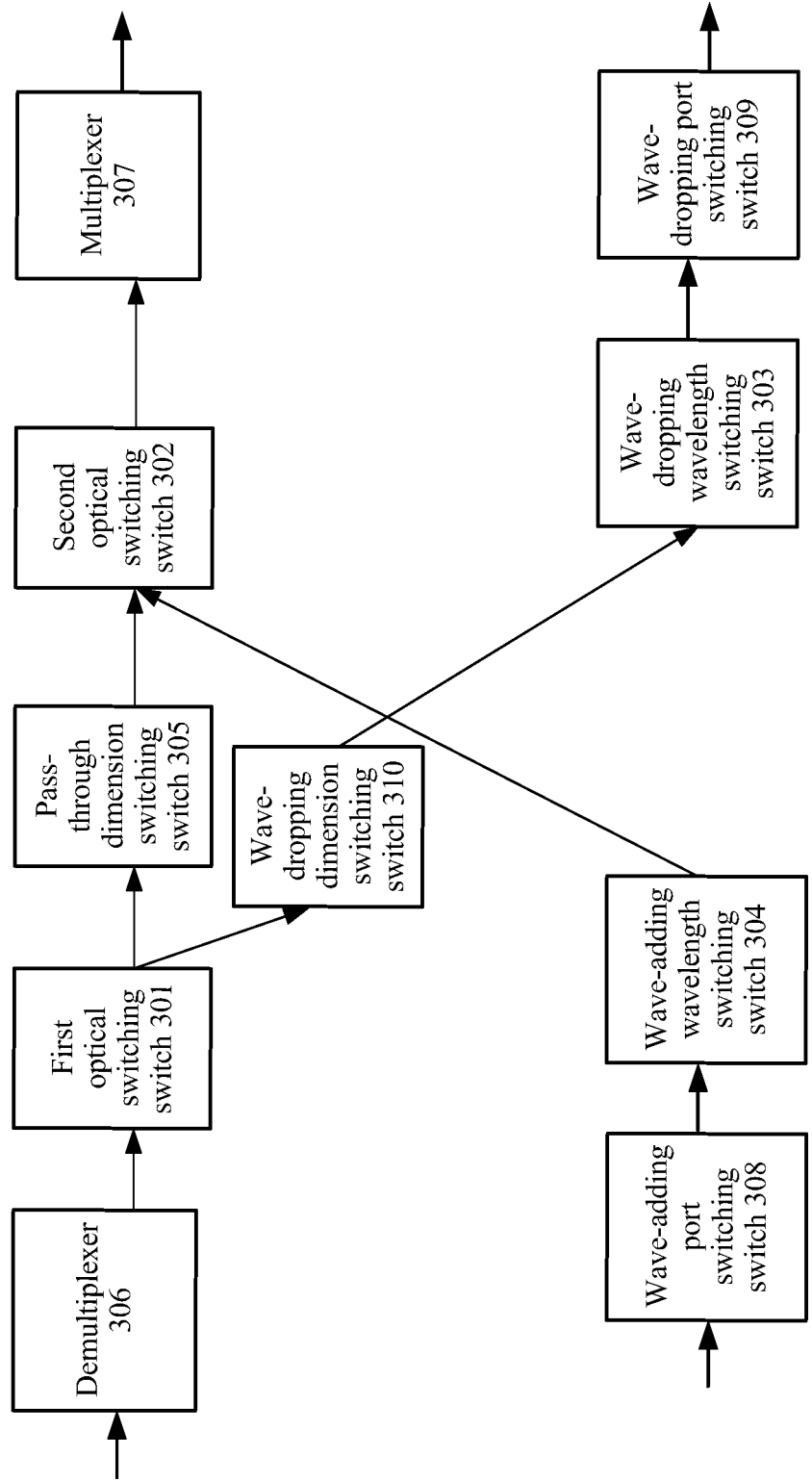
FIG. 5 is a schematic block diagram of an optical cross-connect node according to another embodiment of the present disclosure.

FIG. 5 is a schematic block diagram of an optical cross-connect node according to another embodiment of the present disclosure. For ease of understanding, a device in FIG. 5 that is the same as that in FIG. 4 may use a same number. The optical cross-connect node in this embodiment of the present disclosure may further include a wave-dropping dimension switching switch 310.

The wave-dropping dimension switching switch 310 performs dimension switching on a first optical signal from the first optical switching switch 301, and sends, to the wave-dropping wavelength switching switch 303, the first optical signal that has undergone dimension switching.

A first output port of the first optical switching switch 301 is connected to an input port of the pass-through dimension switching switch 305, a second output port of the first optical switching switch 301 is connected to an input port of the wave-dropping dimension switching switch 310, an output port of the wave-dropping dimension switching switch 310 is connected to an input port of the wave-dropping wavelength switching switch 303, a first input port of the second optical switching switch 302 is connected to an output port of the pass-through dimension switching switch 305, and a second input port of the second optical switching switch 302 is connected to an output port of the wave-adding wavelength switching switch 304.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching, and selection flexibility of a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

It should be understood that the wave-dropping dimension switching switch 310 in this embodiment of the present disclosure may include multiple optical switches of a cross-bar structure, for example, may include multiple 1×2 switches, 2×2 switches, and 2×1 switches.

In a wave dropping process, multiple wavelengths may be output after the demultiplexer 306 demultiplexes optical signals of multiple dimensions from another node in a network. All of the multiple wavelengths may be dropped to a local node. Alternatively, some wavelengths may be dropped to a local node, and the other wavelengths are used as a pass-through wave to be sent to another network node. Wavelengths (that is, the first optical signal) that are to be dropped to local may first pass through a dimension switching switch, such as the wave-dropping dimension switching switch 310 in this embodiment of the present disclosure. Then, a wavelength switching switch, such as the wave-dropping wavelength switching switch 303 in this embodiment of the present disclosure performs wavelength switching. The wave-dropping port switching switch 309 performs wave-dropping port switching on the wavelengths obtained after switching, and finally the wavelengths are dropped to the local node.

After dimension switching is first performed on the first optical signal that is to be dropped to the local, a wavelength remains unchanged, and a dimension is changed. Then, wavelength switching is performed on the first optical signal, a dimension remains unchanged, and the wavelength is changed.

It should be understood that there may be multiple groups of wave-dropping dimension switching switches in this embodiment of the present disclosure, and a quantity of switches included in each group of wave-dropping dimension switching switches depends on an OXC grouping situation. A relationship between the quantity of switches and a quantity of groups and a correspondence between the wave-dropping dimension switching switch and a port of the wave-dropping wavelength switching switch are described in detail in the following.

Figure 6:
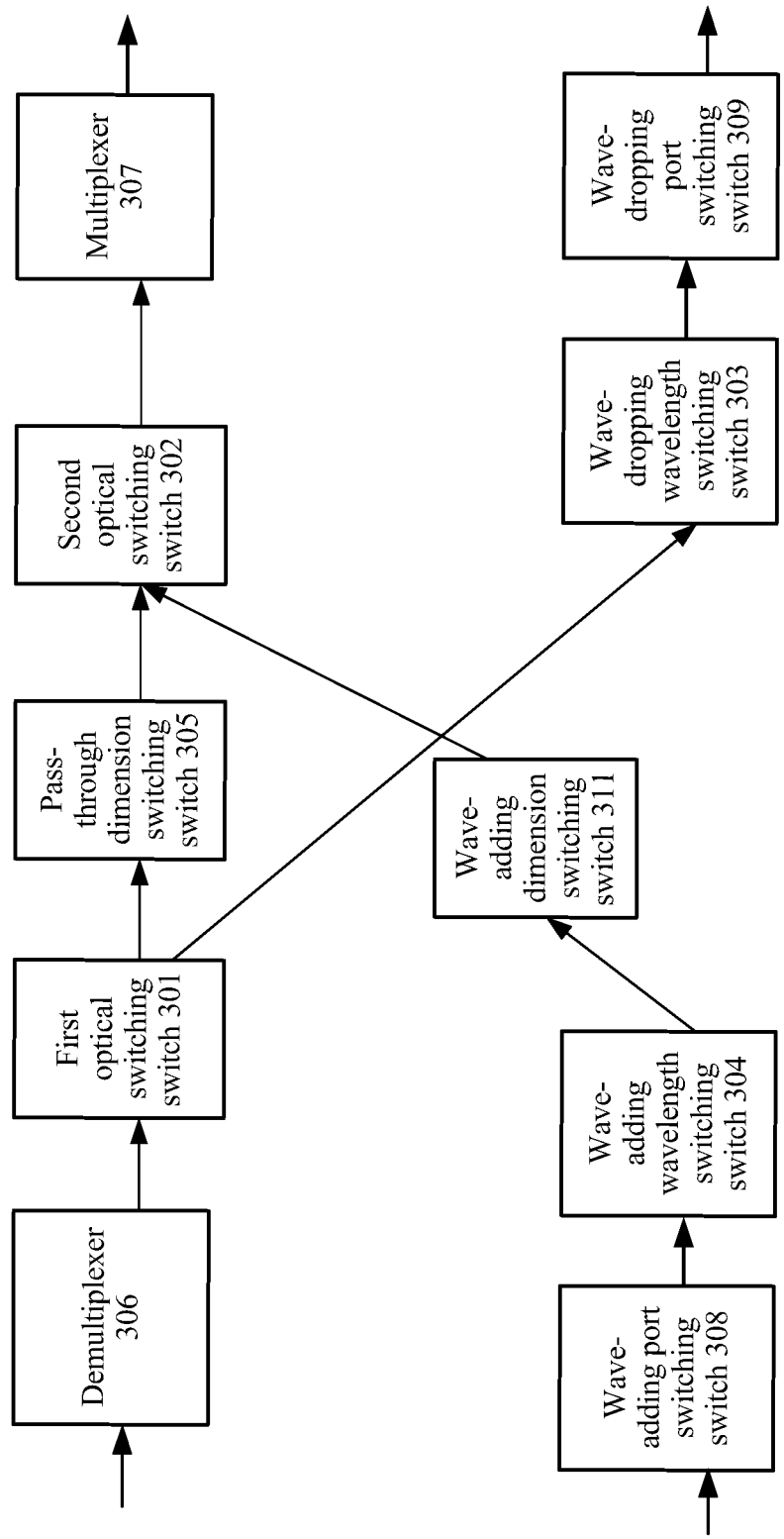
FIG. 6 is a schematic block diagram of an optical cross-connect node according to another embodiment of the present disclosure.

FIG. 6 is a schematic block diagram of an optical cross-connect node according to another embodiment of the present disclosure. For ease of understanding, a device in FIG. 6 that is the same as that in FIG. 4 may use a same number. The optical cross-connect node in this embodiment of the present disclosure may further include a wave-adding dimension switching switch 311.

The wave-adding dimension switching switch 311 performs dimension switching on a third optical signal that has undergone wavelength switching performed by the wave-adding wavelength switching switch 304, and sends, to the second optical switching switch 302, the third optical signal that has undergone dimension switching.

A first output port of the first optical switching switch 301 is connected to an input port of the pass-through dimension switching switch 305, a second output port of the first optical switching switch 301 is connected to an input port of the wave-dropping wavelength switching switch 303, a first input port of the second optical switching switch 302 is connected to an output port of the pass-through dimension switching switch 305, a second input port of the second optical switching switch 302 is connected to an output port of the wave-adding dimension switching switch 311, and an input port of the wave-adding dimension switching switch 311 is connected to an output port of the wave-adding wavelength switching switch 304.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-adding switching, and selection flexibility of a wave-adding port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

It should be understood that the wave-adding dimension switching switch 311 in this embodiment of the present disclosure may include multiple optical switches of a crossbar structure, for example, may include multiple 1×2 switches, 2×2 switches, and 2×1 switches.

In a wave adding process, the wave-adding port switching switch 308 may perform wave-adding port switching on the third optical signal from a local node. A wavelength switching switch (such as the wave-adding wavelength switching switch 304 in this embodiment of the present disclosure) performs wavelength switching on wavelengths obtained after port switching. A dimension switching switch, such as the wave-adding dimension switching switch 311 in this embodiment of the present disclosure, performs dimension switching on the wavelengths obtained after wavelength switching. The wavelengths obtained after dimension switching are sent to the second optical switching switch 302, and finally are sent to the multiplexer 307 for multiplexing and then output to an output port.

Wavelength switching is first performed on wavelengths of the third optical signal generated locally, dimensions remain unchanged, and the wavelengths are changed. Then, dimension switching is performed on wavelengths of the third optical signal, the wavelengths remain unchanged, and the dimensions are changed.

It should be understood that there may be multiple groups of wave-adding dimension switching switches in this embodiment of the present disclosure, and a quantity of switches included in each group of wave-adding dimension switching switches depends on an OXC grouping situation. A relationship between the quantity of switches and a quantity of groups and a correspondence between the wave-adding dimension switching switch and a port of the wave-adding wavelength switching switch are described in detail in the following.

Figure 7:
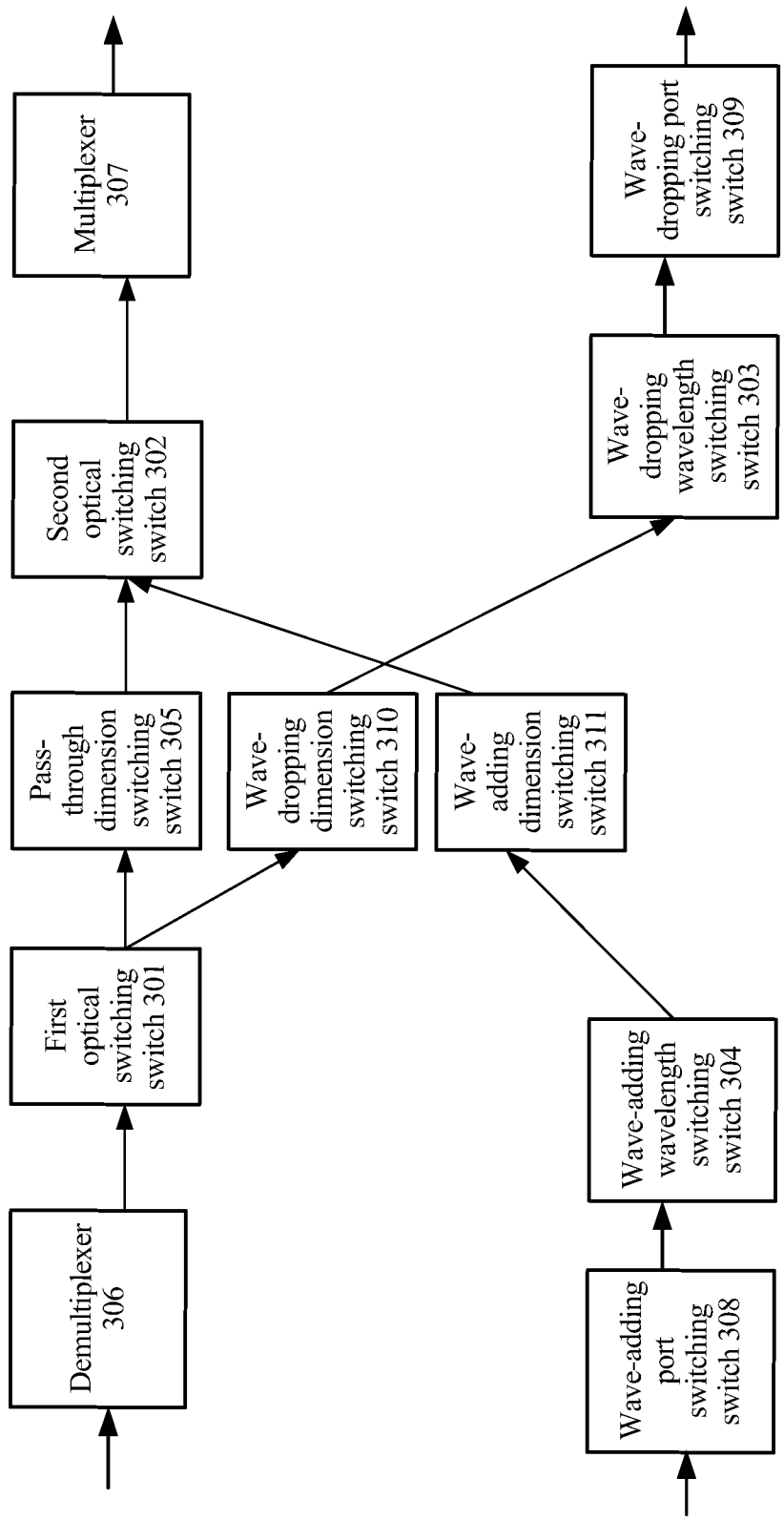
FIG. 7 is a schematic block diagram of an optical cross-connect node according to another embodiment of the present disclosure.

FIG. 7 is a schematic block diagram of an optical cross-connect node according to another embodiment of the present disclosure. For ease of understanding, a device in FIG. 7 that is the same as that in FIG. 4 to FIG. 6 may use a same number. The optical cross-connect node in this embodiment of the present disclosure may further include a wave-adding dimension switching switch 311 and a wave-dropping dimension switching switch 310.

The wave-dropping dimension switching switch 310 performs dimension switching on a first optical signal from the first optical switching switch 301, and sends, to the wave-dropping wavelength switching switch 303, the first optical signal that has undergone dimension switching. The wave-adding dimension switching switch 311 performs dimension switching on a third optical signal that has undergone wavelength switching performed by the wave-adding wavelength switching switch 304, and sends, to the second optical switching switch 302, the third optical signal that has undergone dimension switching.

A first output port of the first optical switching switch 301 is connected to an input port of the pass-through dimension switching switch 305, a second output port of the first optical switching switch 301 is connected to an input port of the wave-dropping dimension switching switch 310, an output port of the wave-dropping dimension switching switch 310 is connected to an input port of the wave-dropping wavelength switching switch 303, a first input port of the second optical switching switch 302 is connected to an output port of the pass-through dimension switching switch 305, a second input port of the second optical switching switch 302 is connected to an output port of the wave-adding dimension switching switch 311, and an input port of the wave-adding dimension switching switch 311 is connected to an output port of the wave-adding wavelength switching switch 304.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for both wave-dropping switching and wave-adding switching, and selection flexibility of a wave-dropping port and a wave-adding port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Three embodiments of FIG. 5 to FIG. 7 may be summarized as follows.

When the wave-adding wavelength switching switch 304 and the wave-dropping wavelength switching switch 303 are included in this embodiment of the present disclosure, a wave adding process may be as follows.

The wave-adding port switching switch 308 may perform wave-adding port switching on an optical signal from a local node; the wave-adding wavelength switching switch 304 performs wavelength switching on wavelengths obtained after port switching; the second optical switching switch 302 performs port switching on the wavelengths obtained after wavelength switching, and finally the wavelengths are multiplexed by the multiplexer 307 and then output to an output port.

A wave dropping process may be as follows.

Multiple wavelengths may be output after the demultiplexer 306 demultiplexes optical signals of multiple dimensions from another node on a network. All of the multiple wavelengths may be dropped to a local node. Alternatively, some wavelengths may be dropped to a local node, and the other wavelengths are used as a pass-through wave to be sent to another network node. The first optical switching switch 301 performs port switching on the wavelengths. The pass-through dimension switching switch 305 may perform dimension switching on the pass-through wave (that is, the second optical signal), and the second optical switching switch 302 performs port switching on wavelengths that have undergone dimension switching. Finally, the wavelengths that have undergone port switching are multiplexed by the multiplexer 307 and then output to an output port. Wavelengths (that is, the first optical signal) that are to be dropped to local may pass through the wave-dropping wavelength switching switch 303, and the wave-dropping port switching switch 309 performs wave-dropping port switching on wavelengths obtained after wavelength switching. Finally, the wavelengths that have undergone port switching are dropped to the local node.

When the wave-adding wavelength switching switch 304, the wave-dropping wavelength switching switch 303, and the wave-dropping dimension switching switch 310 are included in this embodiment of the present disclosure, a wave adding process is the same as the wave adding process in which only the wave-adding wavelength switching switch 304 and the wave-dropping wavelength switching switch 303 are included, and details are not described herein. A wave dropping process may be as follows.

Multiple wavelengths may be output after the demultiplexer 306 demultiplexes optical signals of multiple dimensions from another node on the network. All of the multiple wavelengths may be dropped to a local node. Alternatively, some wavelengths may be dropped to a local node, and the other wavelengths are used as a pass-through wave to be sent to another network node. The first optical switching switch 301 performs port switching on the wavelengths. The pass-through dimension switching switch 305 may perform dimension switching on the pass-through wave (that is, the second optical signal), and the second optical switching switch 302 performs port switching on wavelengths that have undergone dimension switching. Finally, the wavelengths that have undergone port switching are multiplexed by the multiplexer 307 and then output to an output port. Wavelengths (that is, the first optical signal) that are to be dropped to the local may pass through the wave-dropping dimension switching switch 310 and then pass through the wave-dropping wavelength switching switch 303. The wave-dropping port switching switch 309 performs wave-dropping port switching on wavelengths obtained after switching, and finally the wavelengths that have undergone port switching are dropped to the local node.

When the wave-adding wavelength switching switch 304, the wave-dropping wavelength switching switch 303, and the wave-adding dimension switching switch 311 are included in this embodiment of the present disclosure, a wave adding process may be as follows.

The wave-adding port switching switch 308 may perform wave-adding port switching on an optical signal from a local node; the wave-adding wavelength switching switch 304 performs wavelength switching on wavelengths that have undergone port switching; the wave-adding dimension switching switch 311 performs dimension switching on wavelengths obtained after wavelength switching; the second optical switching switch 302 performs port switching on the wavelengths that have undergone dimension switching. Finally, the wavelengths that have undergone port switching are multiplexed by the multiplexer 307 and then output to an output port.

When the wave-adding wavelength switching switch 304, the wave-dropping wavelength switching switch 303, and the wave-adding dimension switching switch 311 are included in this embodiment of the present disclosure, a wave dropping process may be the same as the wave dropping process in which only the wave-adding wavelength switching switch 304 and the wave-dropping wavelength switching switch 303 are included. To avoid repetition, details are not described herein.

When the wave-adding wavelength switching switch 304, the wave-dropping wavelength switching switch 303, the wave-adding dimension switching switch 311, and the wave-dropping dimension switching switch 310 are included in this embodiment of the present disclosure, a wave adding process may be the same as the wave adding process in which the wave-adding wavelength switching switch 304, the wave-dropping wavelength switching switch 303, and the wave-adding dimension switching switch 311 are included, and a wave dropping process is the same as the wave dropping process in which the wave-adding wavelength switching switch 304, the wave-dropping wavelength switching switch 303, and the wave-dropping dimension switching switch 310 are included. To avoid repetition, details are not described herein.

Optionally, in another embodiment, the pass-through dimension switching switch 305, the wave-dropping dimension switching switch 310, and the wave-adding dimension switching switch 311 may be implemented by using an enhanced dilated banyan (EDB) switch. The wave-adding wavelength switching switch 304 and the wave-dropping wavelength switching switch 303 may be implemented by using a path independent loss (PILOSS) switch. The wave-adding port switching switch 308 and the wave-dropping port switching switch 309 may be implemented by using a hybrid dilated benes with EDB (HDBE) switch.

Figure 8:
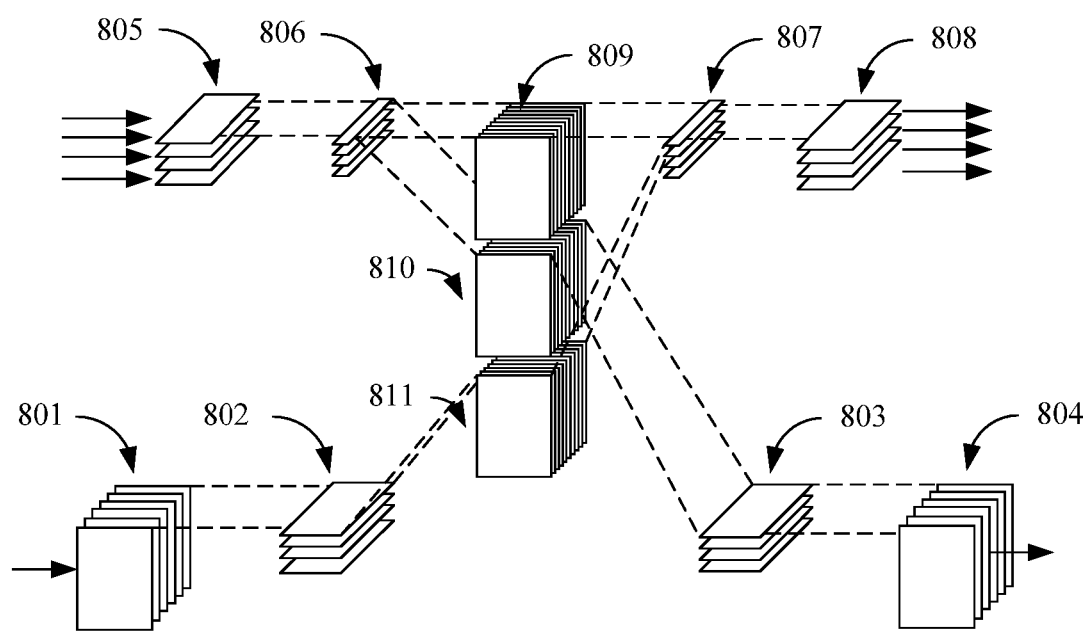
FIG. 8 is a schematic diagram of a stereoscopic structure of an optical cross-connect node according to an embodiment of the present disclosure.

FIG. 8 is a schematic diagram of a stereoscopic structure of an optical cross-connect node according to an embodiment of the present disclosure. With reference to FIG. 8, the following describes in detail the stereoscopic structure of the optical cross-connect node and connection relationships between switches.

In FIG. 8, a wave-adding port switching switch 801, a wave-adding wavelength switching switch 802, a wave-dropping wavelength switching switch 803, a wave-dropping port switching switch 804, a WDM demultiplexer group 805, a 1×2 optical switch group 806, a 2×1 optical switch group 807, a WDM multiplexer group 808, a pass-through dimension switching switch 809, a wave-dropping dimension switching switch 810, and a wave-adding dimension switching switch 811 are included.

In this embodiment of the present disclosure, in a four-dimensional OXC node, it is assumed that each dimension of the OXC includes 80 wavelengths, the wavelengths are grouped into eight groups, and each group includes 10 wavelengths. The 10 wavelengths in each group are different wavelengths. It can be assumed that there is no wavelength switching function, and the pass-through dimension switching switch 809 is configured to implement dimension switching between same wavelengths. The wave-adding wavelength switching switch 802 and the wave-dropping wavelength switching switch 804 are configured to implement wavelength switching in a same dimension.

Table 1 is an allocation relationship table between a port of a demultiplexer/multiplexer and a wavelength.

TABLE 1

Allocation relationship table between a port of a demultiplexer/multiplexer and a wavelength

| Group number | Port of a demultiplexer/multiplexer | Wavelength |
|---|---|---|
| 1 | 1, 2, . . . , 10 | 1, 9, 17, . . . , 73 |
| 2 | 11, 12, . . . , 20 | 2, 10, 18, . . . , 74 |
| 3 | 21, 22, . . . , 30 | 3, 11, 19, . . . , 75 |
| 4 | 31, 32, . . . , 40 | 4, 12, 20, . . . , 76 |
| 5 | 41, 42, . . . , 50 | 5, 13, 21, . . . , 77 |
| 6 | 51, 52, . . . , 60 | 6, 14, 22, . . . , 78 |
| 7 | 61, 62, . . . , 70 | 7, 15, 23, . . . , 79 |
| 8 | 71, 72, . . . , 80 | 8, 16, 24, . . . , 80 |

As shown in Table 1, in an example of the first group of wavelengths, the first group of wavelengths include 10 wavelengths, that is wavelengths 1, 9, 17, . . . , 73, and the 10 different wavelengths in the first group of wavelengths are respectively corresponding to 10 ports, that is ports 1, 2, . . . , 10, of the demultiplexer/multiplexer.

According to the wavelength grouping manner in this embodiment of the present disclosure, a spacing between wavelengths of each group in the wave-adding wavelength switching switch and the wave-dropping wavelength switching switch may be as long as possible, and crosstalk can be avoided.

According to the grouping manner, when there are 10 different wavelengths in each group, a quantity of groups and a quantity of switches in each optical switch in the optical cross-node in FIG. 8 may be determined. It should be understood that each dimension includes eight groups of wavelengths, and FIG. 8 only shows one of the eight groups of optical switches.

It is assumed that six input ports are used for wave adding, and six output ports are used for wave dropping. The wave-adding port switching switch 801 shown in FIG. 8 may include one group of 32×32 optical switches, and the group includes six optical switches, that is, six 32×32 optical switches. Correspondingly, the wave-adding wavelength switching switch 802 may include eight groups of 6×10 optical switches, and each group includes four optical switches, that is, four 6×10 optical switches. Correspondingly, the wave-dropping wavelength switching switch 803 may include eight groups of 10×6 optical switches, and each group includes four optical switches, that is, four 10×6 optical switches. The wave-dropping port switching switch 804 may include one group of 32×32 optical switches, and each group includes six optical switches, that is, six 32×32 optical switches.

The WDM demultiplexer group 805 may use a wavelength division demultiplexer (WDM DEMUX), and the WDM multiplexer group 808 may use a wavelength division multiplexer (WDM MUX). A quantity of WDM demultiplexers in the WDM demultiplexer group 805 may be a quantity of dimensions in a network, and a quantity of WDM multiplexers in the WDM multiplexer group 808 may be the quantity of dimensions in the network. For example, there are four dimensions in this embodiment of the present disclosure, the WDM demultiplexer group 805 may include four WDM demultiplexers, and the WDM multiplexer group 808 may include four WDM multiplexers.

If the network includes four dimensions, each dimension includes 80 wavelengths, the wavelengths are grouped into eight groups, and each group includes 10 different wavelengths, the 1×2 optical switch group 806 may include eight groups of 1×2 optical switches, the 2×1 optical switch group 807 may include eight groups of 2×1 optical switches. Each group of 1×2 optical switches may include 40 1×2 optical switches, and each group of 2×1 optical switches may include 40 2×1 optical switches.

The pass-through dimension switching switch 809 may include eight groups of 4×4 optical switches, and each group includes 10 optical switches, that is, 10 4×4 optical switches. The wave-dropping dimension switching switch 810 may include eight groups of 4×4 optical switches, and each group includes 10 optical switches, that is, 10 4×4 optical switches. The wave-adding dimension switching switch 811 may include eight groups of 4×4 optical switches, and each group includes 10 optical switches, that is, 10 4×4 optical switches.

The connection relationships in the optical cross-connect nodes shown in FIG. 8 may be as follows.

A manner for connecting the 1×2 optical switch group 806 and the WDM demultiplexer group 805 may be symmetrical to a manner for connecting the 2×1 optical switch group 807 and the WDM multiplexer group 808.

Output ports of first switches in the wave-adding wavelength switching switch 802 may be connected to first input ports of all switches in the wave-adding dimension switching switch 811 in a one-to-one manner. Output ports of second switches in the wave-adding wavelength switching switch 802 may be connected to second input ports of all switches in the wave-adding dimension switching switch 811 in a one-to-one manner, and so on.

Input ports of first switches in the wave-dropping wavelength switching switch 803 are connected to first output ports of all switches in the wave-dropping dimension switching switch 810 in a one-to-one manner. Input ports of second switches in the wave-dropping wavelength switching switch 803 may be connected to second output ports of all switches in the wave-dropping dimension switching switch 810 in a one-to-one manner, and so on.

Input ports of a first switch in a first group in the wave-adding wavelength switching switch 802 may be connected to first output ports of all switches in the wave-adding port switching switch 801 in a one-to-one manner. Input ports of a second switch in the first group in the wave-adding wavelength switching switch 802 are one-to-one connected to second output ports of all switches in the wave-adding port switching switch 801 in a one-to-one manner. Input ports of a first switch in a second group in the wave-adding wavelength switching switch 802 are connected to fifth output ports of all switches in the wave-adding port switching switch 801 in a one-to-one manner. Input ports of a second switch in the second group in the wave-adding wavelength switching switch 802 are connected to sixth output ports of all switches in the wave-adding port switching switch 801 in a one-to-one manner, and so on.

Output ports of a first switch in a first group in the wave-dropping wavelength switching switch 803 may be connected to first input ports of all switches in the wave-dropping port switching switch 804 in a one-to-one manner. Output ports of a second switch in the first group in the wave-dropping wavelength switching switch 803 may be connected to second input ports of all switches in the wave-dropping port switching switch 804 in a one-to-one manner. Output ports of a first switch in a second group in the wave-dropping wavelength switching switch 803 may be connected to fifth input ports of all switches in the wave-dropping port switching switch 804 in a one-to-one manner. Output ports of a second switch in the second group in the wave-dropping wavelength switching switch 803 may be connected to sixth input ports of all switches in the wave-dropping port switching switch 804 in a one-to-one manner, and so on.

After passing through the WDM demultiplexer group 805 first, a WDM optical signal is divided into eight independent groups of wavelengths. Each WDM demultiplexer in the WDM demultiplexer group 805 may include 80 ports. In an example of a first group, input ports of 40 1×2 optical switches may be connected to a first group of output ports of the WDM demultiplexer group 805 (each WDM demultiplexer is connected to 10 ports, and four WDM demultiplexers are connected to 40 ports). First output ports of the 40 1×2 optical switches are connected to input ports of the pass-through dimension switching switch 809. Second output ports of the 40 1×2 optical switches are connected to input ports of the wave-dropping dimension switching switch 810. Output ports of 40 2×1 optical switches are connected to a first group of input ports of the WDM multiplexer group 806 (each WDM multiplexer is connected to 10 ports, and four WDM multiplexers are connected to 40 ports). First input ports of the 40 2×1 optical switches are connected to output ports of the pass-through dimension switching switch 809. Second input ports of the 40 2×1 optical switches are connected to output ports of the wave-adding dimension switching switch 811.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching and/or a dimension switching switch is added for wave-adding switching, and selection flexibility of a wave-adding port and/or a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

The following describes in detail a quantity of groups of each apparatus and a quantity of switches in each group.

It is assumed that an OXC node is an N-dimensional node, each dimension includes M wavelengths, and the M wavelengths are grouped into K groups, that is, each group includes L (that is, M/K) wavelengths. N, M, L, and K are positive integers. The N-dimensional OXC node includes K groups of first optical switching switches, K groups of second optical switching switches, K groups of wave-adding wavelength switching switches, K groups of wave-dropping wavelength switching switches, and K groups of pass-through dimension switching switches.

The first optical switching switches include N×L 1×2 switches and are configured to receive an optical signal, where the optical signal includes a first optical signal and/or a second optical signal, send the first optical signal to the wave-dropping wavelength switching switches, and send the second optical signal to the pass-through dimension switching switches.

The wave-dropping wavelength switching switches include N L×X switches and are configured to perform wavelength switching on the first optical signal from the first optical switching switches, where X is a positive integer less than or equal to L.

The wave-adding wavelength switching switches include N X×L switches and are configured to perform wavelength switching on a third optical signal generated locally, and send, to the second optical switching switches, the third optical signal that has undergone wavelength switching performed by the wave-adding wavelength switching switches.

The pass-through dimension switching switches include L N×N switches and are configured to perform dimension switching on the second optical signal from the first optical switching switches, and send, to the second optical switching switches, the second optical signal that has undergone dimension switching.

The second optical switching switches include N×L 2×1 switches and are configured to receive and send the second optical signal from the pass-through dimension switching switches and the third optical signal from the wave-adding wavelength switching switches.

Optionally, in another embodiment, first output ports of the first optical switching switches are connected to input ports of the pass-through dimension switching switches, second output ports of the first optical switching switches are connected to input ports of the wave-dropping wavelength switching switches, first input ports of the second optical switching switches are connected to output ports of the pass-through dimension switching switches, and second input ports of the second optical switching switches are connected to output ports of the wave-adding wavelength switching switches.

Optionally, in another embodiment, the N-dimensional OXC node may further include K groups of wave-dropping dimension switching switches, and the wave-dropping dimension switching switches include L N×N switches and are configured to perform dimension switching on the first optical signal from the first optical switching switches, and send, to the wave-dropping wavelength switching switches, the first optical signal that has undergone dimension switching.

First output ports of the first optical switching switches are connected to input ports of the pass-through dimension switching switches, second output ports of the first optical switching switches are connected to input ports of the wave-dropping dimension switching switches, output ports of the wave-dropping dimension switching switches are connected to input ports of the wave-dropping wavelength switching switches, first input ports of the second optical switching switches are connected to output ports of the pass-through dimension switching switches, and second input ports of the second optical switching switches are connected to output ports of the wave-adding wavelength switching switches.

Optionally, in another embodiment, the N-dimensional OXC node may further include K groups of wave-adding dimension switching switches, and the wave-adding dimension switching switches include L N×N switches and are configured to perform dimension switching on the third optical signal that has undergone wavelength switching performed by the wave-adding wavelength switching switch, and send, to the second optical switching switches, the third optical signal that has undergone dimension switching.

First output ports of the first optical switching switches are connected to input ports of the pass-through dimension switching switches, second output ports of the first optical switching switches are connected to input ports of the wave-dropping wavelength switching switches, first input ports of the second optical switching switches are connected to output ports of the pass-through dimension switching switches, second input ports of the second optical switching switches are connected to output ports of the wave-adding dimension switching switches, and input ports of the wave-adding dimension switching switches are connected to output ports of the wave-adding wavelength switching switches.

Optionally, in another embodiment, the N-dimensional OXC node may further include K groups of wave-adding dimension switching switches and K groups of wave-dropping dimension switching switches. The wave-dropping dimension switching switches are configured to perform dimension switching on the first optical signal from the first optical switching switches, and send, to the wave-dropping wavelength switching switches, the first optical signal that has undergone dimension switching. The wave-adding dimension switching switches are configured to perform dimension switching on the third optical signal that has undergone wavelength switching performed by the wave-adding wavelength switching switches, and send, to the second optical switching switches, the third optical signal that has undergone dimension switching.

First output ports of the first optical switching switches are connected to input ports of the pass-through dimension switching switches, second output ports of the first optical switching switches are connected to input ports of the wave-dropping dimension switching switches, output ports of the wave-dropping dimension switching switches are connected to input ports of the wave-dropping wavelength switching switches, first input ports of the second optical switching switches are connected to output ports of the pass-through dimension switching switches, second input ports of the second optical switching switches are connected to output ports of the wave-adding dimension switching switches, and input ports of the wave-adding dimension switching switches are connected to output ports of the wave-adding wavelength switching switches.

It should be understood that, when the wave-adding wavelength switching switches include N X×L switches, a wave adding ratio of the wave-adding wavelength switching switches is X/L. When the wave-dropping wavelength switching switches include N L×X switches, a wave dropping ratio of the wave-dropping wavelength switching switches is X/L.

Optionally, in another embodiment, the N-dimensional OXC node may further include N demultiplexers, N multiplexers, a wave-adding port switching switch, and a wave-dropping port switching switch. The demultiplexers are configured to demultiplex a wavelength division multiplexing signal from a network node, and send the optical signal obtained after demultiplexing to the first optical switching switches, where output ports of the demultiplexers are connected to input ports of the first optical switching switches. The multiplexers are configured to multiplex the second optical signal from the second optical switching switch and the third optical signal from the second optical switching switch to obtain a wavelength division multiplexing signal, where input ports of the multiplexers are connected to output ports of the second optical switching switches. The wave-adding port switching switches include X (N×K)×(N×K) optical switches and are configured to perform division and port switching on an optical signal generated locally to obtain the third optical signal, and send the third optical signal to the wave-adding wavelength switching switches, where output ports of the wave-adding port switching switches are connected to input ports of the wave-adding wavelength switching switches. The wave-dropping port switching switches include X (N×K)×(N×K) optical switches and are configured to perform division and port switching on the first optical signal that has undergone wavelength switching performed by the wave-dropping wavelength switching switches, where input ports of the wave-dropping port switching switches are connected to output ports of the wave-dropping wavelength switching switches.

Figure 9:
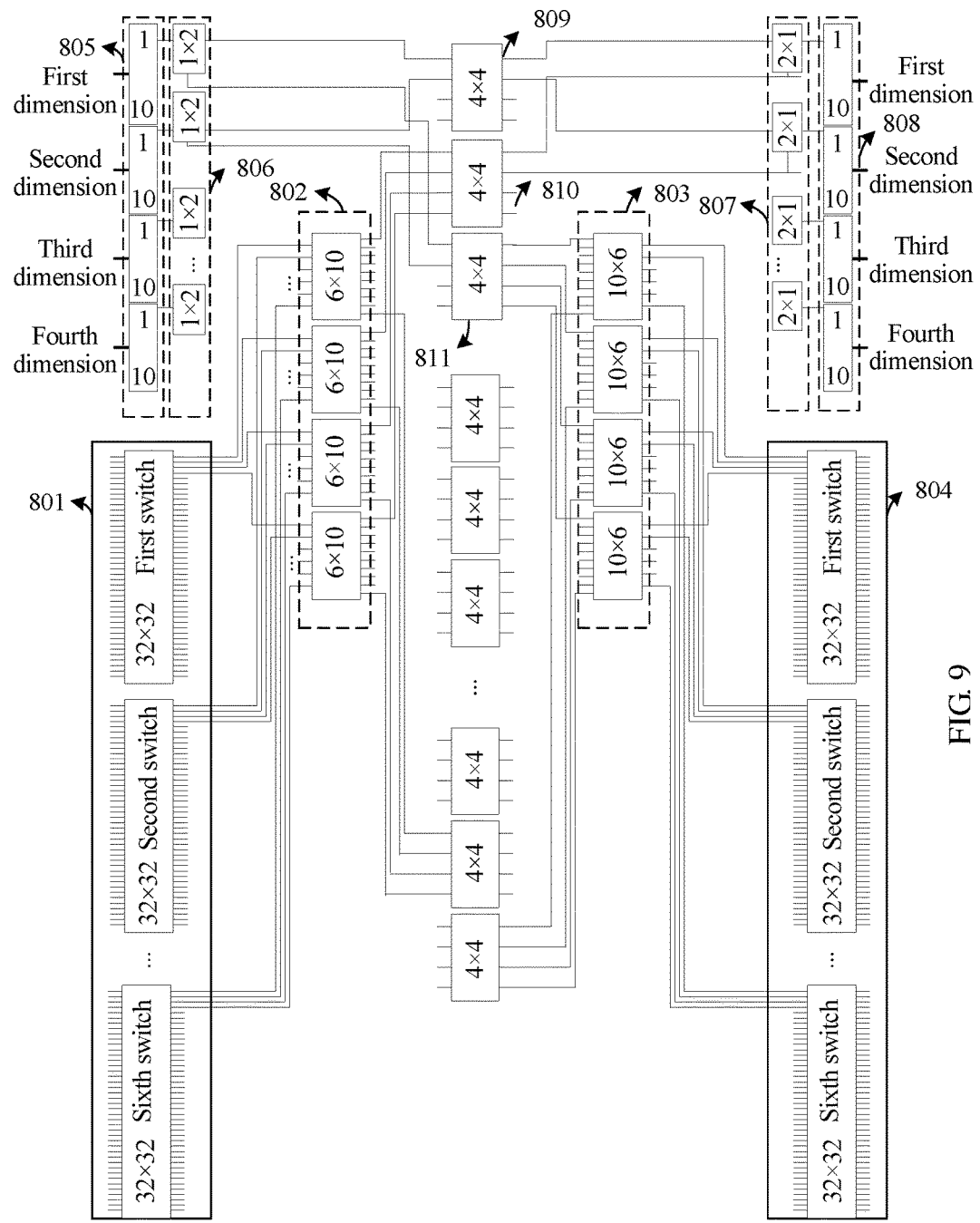
FIG. 9 is a schematic diagram of a planar structure of an optical cross-connect node according to an embodiment of the present disclosure.

With reference to FIG. 9, the following describes a planar structure of the optical cross-connect node shown in FIG. 8.

FIG. 9 is a schematic diagram of a planar structure of an optical cross-connect node according to an embodiment of the present disclosure. A part in FIG. 9 that is the same as that in FIG. 8 uses a same number, and only a planar structure of the schematic diagram of the stereoscopic structure shown in FIG. 8 is described.

A manner for connecting the 1×2 optical switch group 806 and the WDM demultiplexer group 805 is symmetrical to a manner for connecting the 2×1 optical switch group 807 and the WDM multiplexer group 808.

Output ports of first switches in the wave-adding wavelength switching switch 802 may be connected to first input ports of all switches in the wave-adding dimension switching switch 811 in a one-to-one manner. Output ports of second switches in the wave-adding wavelength switching switch 802 may be connected to second input ports of all switches in the wave-adding dimension switching switch 811 in a one-to-one manner, and so on.

Input ports of first switches in the wave-dropping wavelength switching switch 803 may be connected to first output ports of all switches in the wave-dropping dimension switching switch 810 in a one-to-one manner. Input ports of second switches in the wave-dropping wavelength switching switch 803 may be connected to second output ports of all switches in the wave-dropping dimension switching switch 810 in a one-to-one manner, and so on.

Input ports of a first switch in a first group in the wave-adding wavelength switching switch 802 are connected to first output ports of all switches in the wave-adding port switching switch 801 in a one-to-one manner. Input ports of a second switch in the first group in the wave-adding wavelength switching switch 802 are connected to second output ports of all switches in the wave-adding port switching switch 801 in a one-to-one manner. Input ports of a first switch in a second group in the wave-adding wavelength switching switch 802 are connected to fifth output ports of all switches in the wave-adding port switching switch 801 in a one-to-one manner. Input ports of a second switch in the second group in the wave-adding wavelength switching switch 802 are connected to sixth output ports of all switches in the wave-adding port switching switch 801 in a one-to-one manner, and so on.

Output ports of a first switch in a first group in the wave-dropping wavelength switching switch 803 are connected to first input ports of all switches in the wave-dropping port switching switch 804 in a one-to-one manner. Output ports of a second switch in the first group in the wave-dropping wavelength switching switch 803 are connected to second input ports of all switches in the wave-dropping port switching switch 804 in a one-to-one manner. Output ports of a first switch in a second group in the wave-dropping wavelength switching switch 803 are connected to fifth input ports of all switches in the wave-dropping port switching switch 804 in a one-to-one manner. Output ports of a second switch in the second group in the wave-dropping wavelength switching switch 803 are connected to sixth input ports of all switches in the wave-dropping port switching switch 804 in a one-to-one manner, and so on.

After passing through the WDM demultiplexer group 805 first, a WDM optical signal is divided into eight independent groups of wavelengths. The WDM demultiplexer group 805 includes four WDM demultiplexers, each WDM demultiplexer may include 80 ports, and each WDM multiplexer may include 80 ports. In an example of a first group, input ports of 40 1×2 optical switches are connected to a first group of output ports of the WDM demultiplexer group 805 (that is, each WDM demultiplexer is connected to 10 ports, and four WDM demultiplexers are connected to 40 ports in total). First output ports of the 40 1×2 optical switches are connected to input ports of the pass-through dimension switching switch 809. Second output ports of the 40 1×2 optical switches are connected to input ports of the wave-dropping dimension switching switch 810. Output ports of 40 2×1 optical switches are connected to a first group of input ports of the WDM multiplexer group 806 (that is, each WDM multiplexer is connected to 10 ports, and four WDM multiplexers are connected to 40 ports in total). First input ports of the 40 2×1 optical switches are connected to output ports of the pass-through dimension switching switch 809. Second input ports of the 40 2×1 optical switches are connected to output ports of the wave-adding dimension switching switch 811.

It should be understood that FIG. 9 only shows some apparatuses. Actually, in FIG. 9, there is one group of wave-adding port switching switches 801, eight groups of wave-adding wavelength switching switches 802, eight groups of wave-dropping wavelength switching switches 803, one group of wave-dropping port switching switches 804, a WDM demultiplexer group 805, eight groups of 1×2 optical switch groups 806, eight groups of 2×1 optical switch groups 807, a WDM multiplexer group 808, eight groups of pass-through dimension switching switches 809, eight groups of wave-dropping dimension switching switches 810, and eight groups of wave-adding dimension switching switches 811.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching and/or a dimension switching switch is added for wave-adding switching, and selection flexibility of a wave-adding port and/or a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Figure 10:
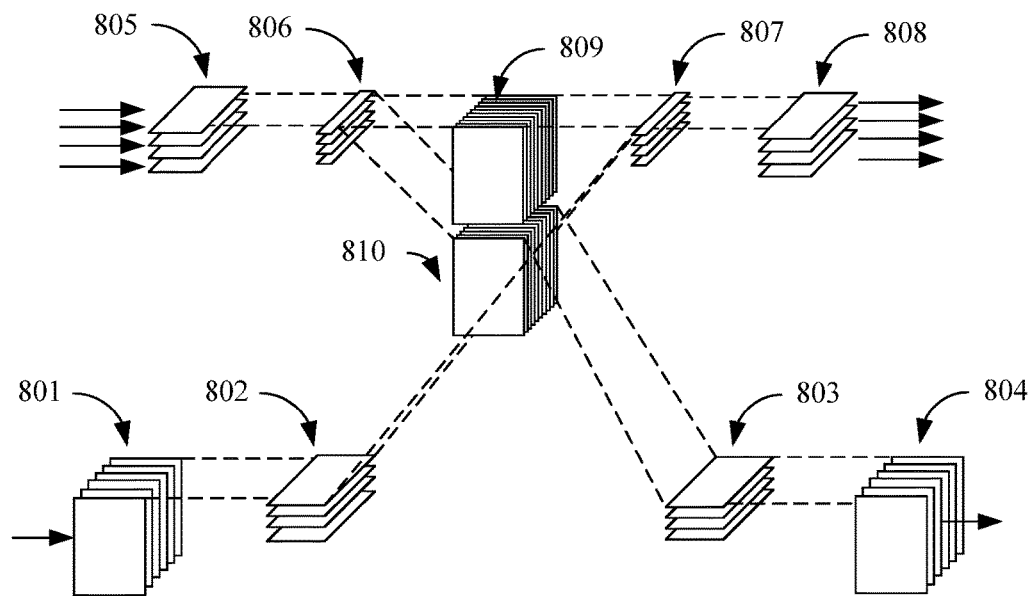
FIG. 10 is a schematic diagram of a stereoscopic structure of an optical cross-connect node according to another embodiment of the present disclosure.

FIG. 10 is a schematic diagram of a stereoscopic structure of an optical cross-connect node according to another embodiment of the present disclosure. A part in FIG. 10 that is the same as that in FIG. 8 uses a same number.

In comparison with FIG. 8, only the wave-adding dimension switching switch 811 in FIG. 8 is omitted in the optical cross-connect node shown in FIG. 10, and connection manners between other parts in the entire structure are the same as those in FIG. 8. In comparison with FIG. 8, selection flexibility of a wave-adding port is sacrificed in the node shown in FIG. 10, and as a result, each switch in the wave-adding port switching switch 801 allows only one port to perform wave adding to a dimension, and a blocking rate is improved slightly. However, in the embodiment shown in FIG. 10, compensation may be performed by using client-side fiber cross-connect (C-FXC). In addition, in comparison with the embodiment shown in FIG. 8, 80 wave-adding dimension switching switches are omitted in this embodiment, and complexity of OXC design is reduced.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching, and selection flexibility of a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Figure 11:
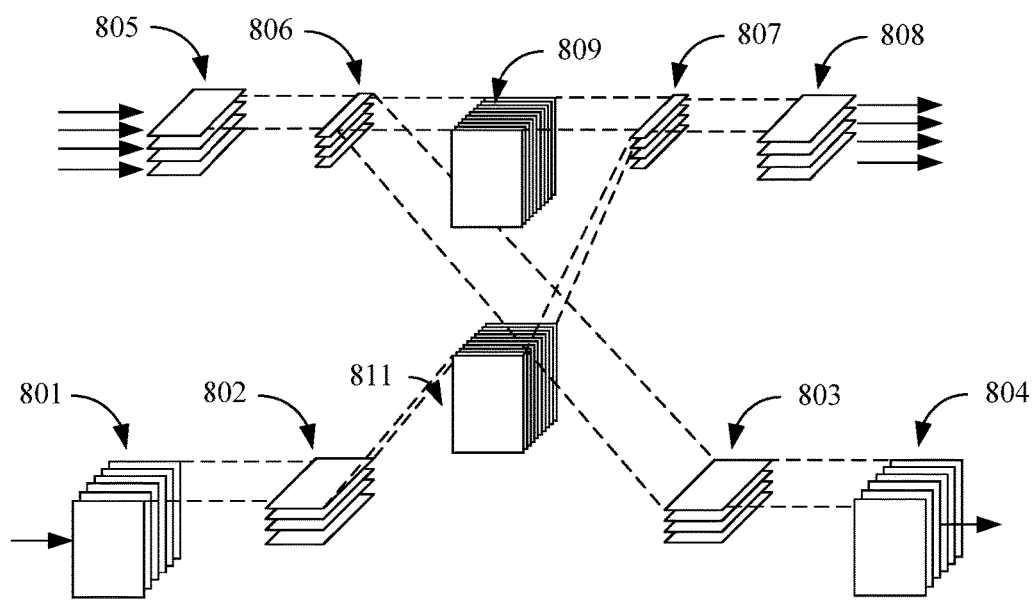
FIG. 11 is a schematic diagram of a stereoscopic structure of an optical cross-connect node according to another embodiment of the present disclosure.

FIG. 11 is a schematic diagram of a stereoscopic structure of an optical cross-connect node according to another embodiment of the present disclosure. A part in FIG. 11 that is the same as that in FIG. 8 uses a same number.

In comparison with FIG. 8, only the wave-dropping dimension switching switch 810 in FIG. 8 is omitted in the optical cross-connect node shown in FIG. 11, and connection manners between other parts in the entire structure are the same as those in FIG. 8. In comparison with FIG. 8, selection flexibility of a wave-dropping port is sacrificed in the node shown in FIG. 11, and as a result, each switch in the wave-dropping port switching switch 804 allows only one port to perform wave dropping, and a blocking rate is improved slightly. However, in the embodiment shown in FIG. 11, compensation may be performed by using C-FXC. In addition, in comparison with the embodiment shown in FIG. 8, 80 wave-dropping dimension switching switches are omitted in this embodiment, and complexity of OXC design is reduced.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-adding switching, and selection flexibility of a wave-adding port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Figure 12:
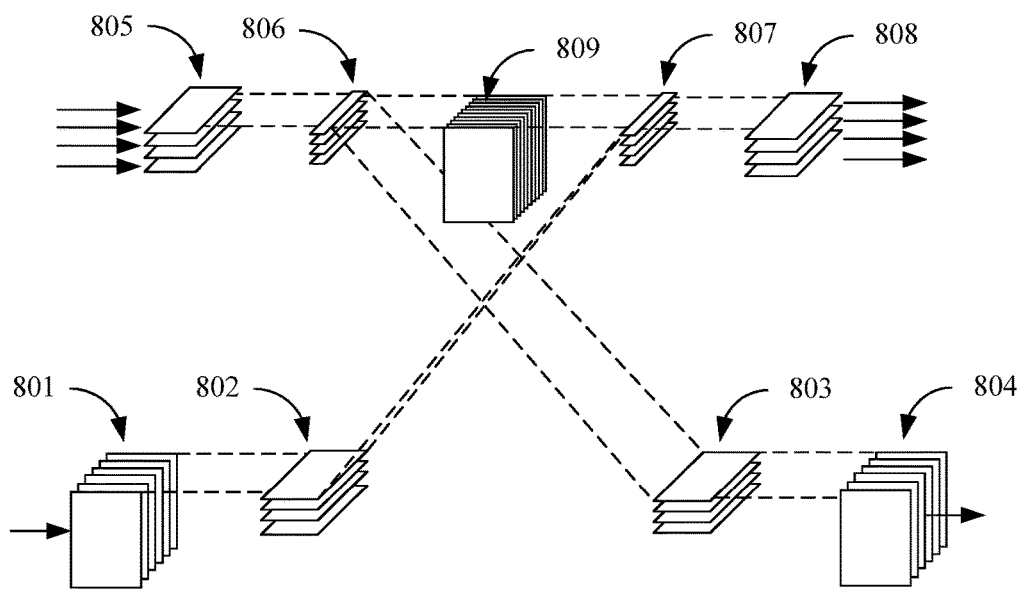
FIG. 12 is a schematic diagram of a stereoscopic structure of an optical cross-connect node according to another embodiment of the present disclosure.

FIG. 12 is a schematic diagram of a stereoscopic structure of an optical cross-connect node according to another embodiment of the present disclosure. A part in FIG. 12 that is the same as that in FIG. 10 may use a same number.

In comparison with FIG. 10, only the wave-dropping dimension switching switch 810 in FIG. 10 is omitted in the optical cross-connect node shown in FIG. 12, and connection manners between other parts in the entire structure are the same as those in FIG. 10. In comparison with FIG. 10, selection flexibility of a wave-dropping port is sacrificed in the node shown in FIG. 12, and as a result, each switch in the wave-dropping port switching switch 804 allows only one port to perform wave dropping, and a blocking rate is improved slightly. However, in the embodiment shown in FIG. 12, compensation may be performed by using C-FXC. In addition, in comparison with the embodiment shown in FIG. 10, 80 wave-dropping dimension switching switches are omitted in this embodiment, and complexity of OXC design is reduced.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, dimension switching is performed independently of wave adding/dropping, and a pass-through wave does not need to pass through a wave-adding/dropping switching switch, so that the pass-through wave is not blocked, and a loss of the pass-through wave is reduced. In addition, dimension switching is performed independently of wave adding/dropping, and a pass-through wave does not need to pass through a wave-adding/dropping switching switch, so that the pass-through wave is not blocked, and a loss of the pass-through wave is reduced.

Figure 13A:
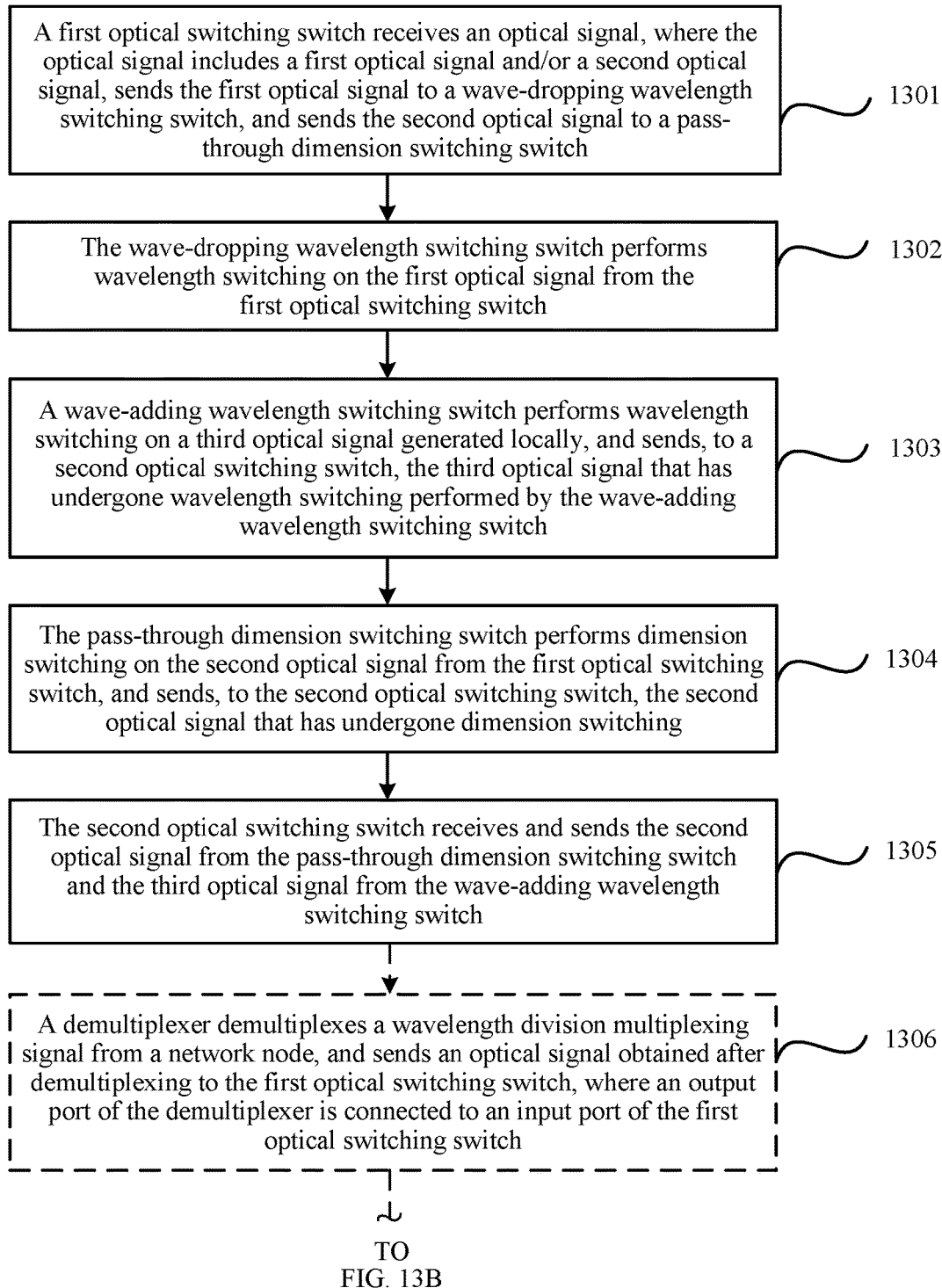
FIG. 13A and FIG. 13B are a schematic flowchart of an optical signal switching method according to an embodiment of the present disclosure.
Figure 13B:
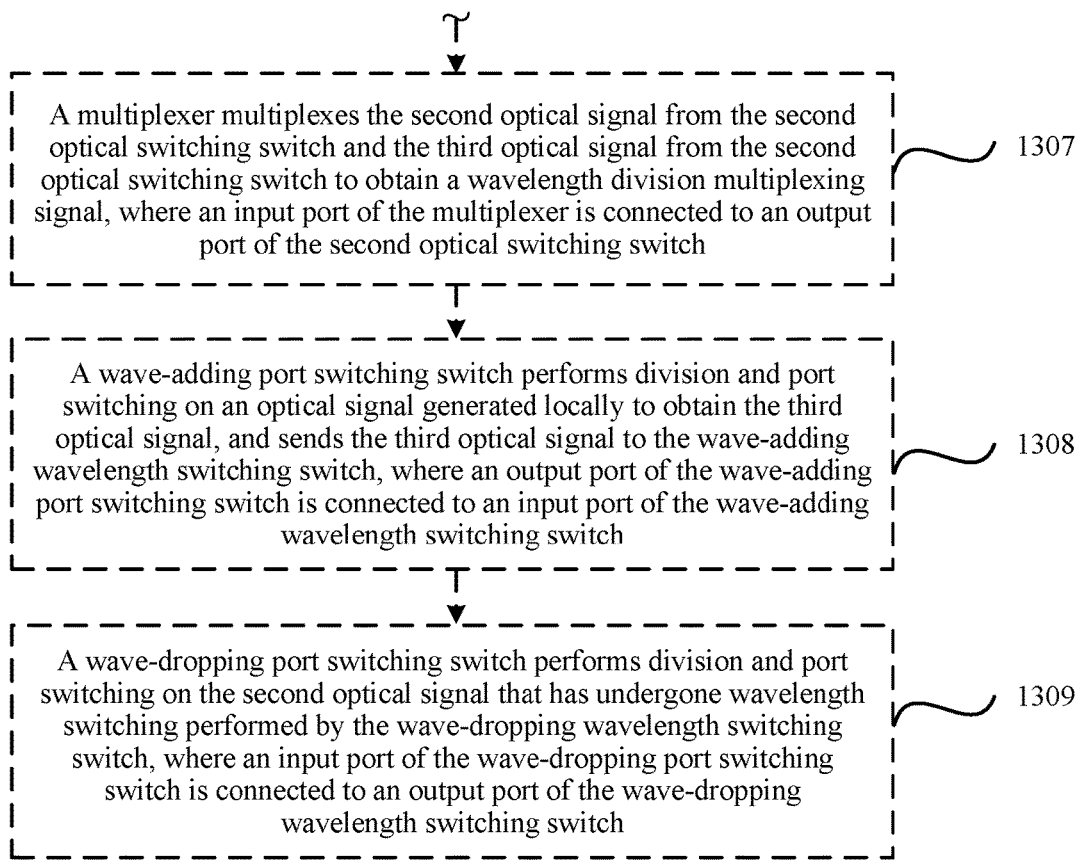

FIG. 13A and FIG. 13B are a schematic flowchart of an optical signal switching method according to an embodiment of the present disclosure. The method shown in FIG. 13A and FIG. 13B may be executed by an optical cross-connect node. The optical cross-connect nodes in FIG. 1 to FIG. 12 may be used to implement the method shown in FIG. 13A and FIG. 13B. To avoid repetition, details are not described herein. The node applied to the method includes a first optical switching switch, a second optical switching switch, a wave-dropping wavelength switching switch, a wave-adding wavelength switching switch, and a pass-through dimension switching switch. The method includes the following steps.

1301. The first optical switching switch receives an optical signal, where the optical signal includes a first optical signal and/or a second optical signal, sends the first optical signal to the wave-dropping wavelength switching switch, and sends the second optical signal to the pass-through dimension switching switch.

1302. The wave-dropping wavelength switching switch performs wavelength switching on the first optical signal from the first optical switching switch.

1303. The wave-adding wavelength switching switch performs wavelength switching on a third optical signal generated locally, and sends, to the second optical switching switch, the third optical signal that has undergone wavelength switching performed by the wave-adding wavelength switching switch.

1304. The pass-through dimension switching switch performs dimension switching on the second optical signal from the first optical switching switch, and sends, to the second optical switching switch, the second optical signal that has undergone dimension switching.

1305. The second optical switching switch receives and sends the second optical signal from the pass-through dimension switching switch and the third optical signal from the wave-adding wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

It should be understood that the first optical switching switch and the second optical switching switch may include at least one optical switch, and the optical switch may be a cross-bar optical switch. A quantity of optical switches included in the first optical switching switch and the second optical switching switch may be related to configurations and functions of the OXC node.

It should be further understood that in this embodiment of the present disclosure, the wave-adding wavelength switching switch, the wave-dropping wavelength switching switch, and the pass-through dimension switching switch may include multiple optical switches of a cross-bar structure, for example, may include multiple 1×2 switches, 2×2 switches, and 2×1 switches. Different functions may be obtained according to different compositional structures, and include wavelength switching and dimension switching. The wavelength switching may be switching between different wavelengths in a same dimension, and the dimension switching may be switching of a same wavelength in different dimensions.

It should be understood that the pass-through dimension switching switch in this embodiment of the present disclosure may include multiple optical switches of a cross-bar structure, for example, may include multiple 1×2 switches, 2×2 switches, and 2×1 switches. In this embodiment of the present disclosure, multiple groups of pass-through dimension switching switches may be included, a quantity of switches included in each group of pass-through dimension switching switches may depend on an OXC grouping situation. A relationship between the quantity of switches and a quantity of groups, a correspondence between the pass-through dimension switching switch and a port of the first optical switching switch, and a correspondence between the pass-through dimension switching switch and a port of the second optical switching switch are described in detail in the following.

Optionally, in another embodiment, a first output port of the first optical switching switch is connected to an input port of the pass-through dimension switching switch, a second output port of the first optical switching switch is connected to an input port of the wave-dropping wavelength switching switch, a first input port of the second optical switching switch is connected to an output port of the pass-through dimension switching switch, and a second input port of the second optical switching switch is connected to an output port of the wave-adding wavelength switching switch.

Optionally, in another embodiment, the node may further include a wave-dropping dimension switching switch, and in step 1301, that the first optical signal is sent to the wave-dropping wavelength switching switch may include.

The first optical switching switch sends the first optical signal to the wave-dropping dimension switching switch; and the wave-dropping dimension switching switch performs dimension switching on the first optical signal from the first optical switching switch, and sends, to the wave-dropping wavelength switching switch, the first optical signal that has undergone dimension switching.

A first output port of the first optical switching switch is connected to an input port of the pass-through dimension switching switch, a second output port of the first optical switching switch is connected to an input port of the wave-dropping dimension switching switch, an output port of the wave-dropping dimension switching switch is connected to an input port of the wave-dropping wavelength switching switch, a first input port of the second optical switching switch is connected to an output port of the pass-through dimension switching switch, and a second input port of the second optical switching switch is connected to an output port of the wave-adding wavelength switching switch.

It should be understood that the wave-dropping dimension switching switch in this embodiment of the present disclosure may include multiple optical switches of a cross-bar structure, for example, may include multiple 1×2 switches, 2×2 switches, and 2×1 switches.

It should be further understood that in this embodiment of the present disclosure, there are multiple groups of wave-adding wavelength switching switches, multiple groups of wave-dropping wavelength switching switches, multiple groups of wave-dropping dimension switching switches, and multiple groups of pass-through dimension switching switches. Only a case of one group is described in this embodiment of the present disclosure.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching, and selection flexibility of a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Optionally, in another embodiment, the node may further include a wave-adding dimension switching switch, in step 1303, that the third optical signal obtained after wavelength switching performed by the wave-adding wavelength switching switch is sent to the second optical switching switch may include.

The wave-adding wavelength switching switch sends, to the wave-adding dimension switching switch, the third optical signal that has undergone wavelength switching performed by the wave-adding wavelength switching switch; and the wave-adding dimension switching switch performs dimension switching on the third optical signal that has undergone wavelength switching performed by the wave-adding wavelength switching switch, and sends, to the second optical switching switch, the third optical signal that has undergone dimension switching.

A first output port of the first optical switching switch is connected to an input port of the pass-through dimension switching switch, a second output port of the first optical switching switch is connected to an input port of the wave-dropping wavelength switching switch, a first input port of the second optical switching switch is connected to an output port of the pass-through dimension switching switch, a second input port of the second optical switching switch is connected to an output port of the wave-adding dimension switching switch, and an input port of the wave-adding dimension switching switch is connected to an output port of the wave-adding wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-adding switching, and selection flexibility of a wave-adding port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

It should be understood that the wave-adding dimension switching switch in this embodiment of the present disclosure may include multiple optical switches of a cross-bar structure, for example, may include multiple 1×2 switches, 2×2 switches, and 2×1 switches.

It should be further understood that in this embodiment of the present disclosure, there are multiple groups of wave-adding wavelength switching switches, multiple groups of wave-dropping wavelength switching switches, multiple groups of wave-adding dimension switching switches, and multiple groups of pass-through dimension switching switches. Only a case of one group is described in this embodiment of the present disclosure.

Optionally, in another embodiment, the node may further include a wave-adding dimension switching switch and a wave-dropping dimension switching switch, in step 1301, that the first optical signal is sent to the wave-dropping wavelength switching switch may include.

The first optical switching switch sends the first optical signal to the wave-dropping dimension switching switch; and the wave-dropping dimension switching switch performs dimension switching on the first optical signal from the first optical switching switch, and sends, to the wave-dropping wavelength switching switch, the first optical signal that has undergone dimension switching.

In step 1303, that the third optical signal that has undergone wavelength switching performed by the wave-adding wavelength switching switch is sent to the second optical switching switch may include.

The wave-adding wavelength switching switch sends, to the wave-adding dimension switching switch, the third optical signal that has undergone wavelength switching performed by the wave-adding wavelength switching switch; and the wave-adding dimension switching switch performs dimension switching on the third optical signal that has undergone wavelength switching performed by the wave-adding wavelength switching switch, and sends, to the second optical switching switch, the third optical signal that has undergone dimension switching.

A first output port of the first optical switching switch is connected to an input port of the pass-through dimension switching switch, a second output port of the first optical switching switch is connected to an input port of the wave-dropping dimension switching switch, an output port of the wave-dropping dimension switching switch is connected to an input port of the wave-dropping wavelength switching switch, a first input port of the second optical switching switch is connected to an output port of the pass-through dimension switching switch, a second input port of the second optical switching switch is connected to an output port of the wave-adding dimension switching switch, and an input port of the wave-adding dimension switching switch is connected to an output port of the wave-adding wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching and wave-adding switching, and selection flexibility of a wave-dropping port and a wave-adding port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

Optionally, in another embodiment, the first optical switching switch may be a 1×2 switch.

Optionally, in another embodiment, the second optical switching switch may be a 2×1 switch.

It should be understood that the 1×2 switch may also be referred to a 1×2 optical switch, and the 2×1 switch may also be referred to a 2×1 optical switch.

Optionally, in another embodiment, the node may further include a demultiplexer, a multiplexer, a wave-adding port switching switch, and a wave-dropping port switching switch. The method shown in FIG. 13A and FIG. 13B may further include.

1306. The demultiplexer demultiplexes a wavelength division multiplexing signal from a network node, and sends the optical signal obtained after demultiplexing to the first optical switching switch, where an output port of the demultiplexer is connected to an input port of the first optical switching switch.

1307. The multiplexer multiplexes the second optical signal from the second optical switching switch and the third optical signal from the second optical switching switch to obtain a wavelength division multiplexing signal, where an input port of the multiplexer is connected to an output port of the second optical switching switch.

1308. The wave-adding port switching switch performs division and port switching on an optical signal generated locally to obtain the third optical signal, and sends the third optical signal to the wave-adding wavelength switching switch, where an output port of the wave-adding port switching switch is connected to an input port of the wave-adding wavelength switching switch.

1309. The wave-dropping port switching switch performs division and port switching on the first optical signal that has undergone wavelength switching performed by the wave-dropping wavelength switching switch, where an input port of the wave-dropping port switching switch is connected to an output port of the wave-dropping wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching and/or a dimension switching switch is added for wave-adding switching, and selection flexibility of a wave-adding port and/or a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

It should be understood that, there may be one group of demultiplexers, one group of multiplexers, one group of wave-adding port switching switches, and one group of wave-dropping port switching switches, and a quantity of switches in each group and configuration of each switch may depend on a dimension and an optical signal grouping situation.

Figure 14:
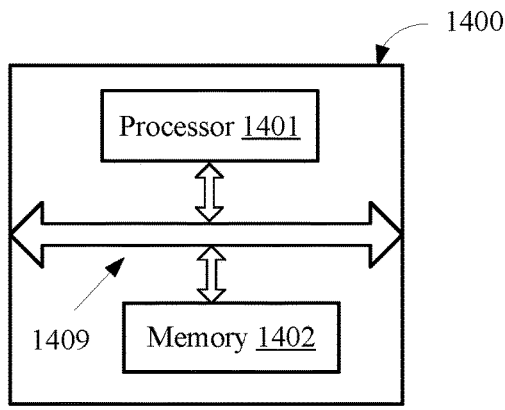
FIG. 14 is a schematic block diagram of an optical cross-connect node according to another embodiment of the present disclosure.

FIG. 14 is a schematic block diagram of an optical cross-connect node according to another embodiment of the present disclosure. A node 1400 in FIG. 14 may be configured to implement steps and methods in the foregoing method embodiments. The node in FIG. 14 includes a processor 1401 and a memory 1402. The processor 1401 is connected to the memory 1402 by using a bus system 1409.

The processor 1401 controls an operation of the node 1400. The memory 1402 may include a read-only memory and a random access memory, and provides an instruction and data for the processor 1401. A part of the memory 1402 may further include a nonvolatile random access memory (NVRAM). All components of the node 1400 are coupled together by using the bus system 1409. In addition to a data bus, the bus system 1409 further includes a power bus, a control bus, and a status signal bus. However, for clear description, various buses are marked as the bus system 1409 in the figure.

The processor 1401 may be an integrated circuit chip and has a signal processing capability. The processor 1401 may be a general processor, a digital signal processor (DSP), an application-specific integrated circuit (ASIC), a field programmable gate array (FPGA), or another programmable logic device, a discrete gate or transistor logic device, or a discrete hardware assembly. Methods, steps, and logical block diagrams disclosed in the embodiments of the present disclosure may be implemented or executed. The general purpose processor may be a microprocessor or this processor may be any conventional processor, or the like. The processor 1401 reads information in the memory 1402 and controls all parts of the node 1400 in combination with hardware of the processor.

The method in FIG. 13A and FIG. 13B may be implemented in the node 1400 in FIG. 14. To avoid repetition, details are not described herein.

The node 1400 includes a first optical switching switch, a second optical switching switch, a wave-dropping wavelength switching switch, a wave-adding wavelength switching switch, and a pass-through dimension switching switch. Under the control of the processor 1401, the node 1400 implements the following operations:

The first optical switching switch receives an optical signal, where the optical signal includes a first optical signal and/or a second optical signal, sends the first optical signal to the wave-dropping wavelength switching switch, and sends the second optical signal to the pass-through dimension switching switch.

The wave-dropping wavelength switching switch performs wavelength switching on the first optical signal from the first optical switching switch.

The wave-adding wavelength switching switch performs wavelength switching on a third optical signal generated locally, and sends, to the second optical switching switch, the third optical signal that has undergone wavelength switching performed by the wave-adding wavelength switching switch.

The pass-through dimension switching switch performs dimension switching on the second optical signal from the first optical switching switch, and sends, to the second optical switching switch, the second optical signal that has undergone dimension switching.

The second optical switching switch receives and sends the second optical signal from the pass-through dimension switching switch and the third optical signal from the wave-adding wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

Optionally, in another embodiment, a first output port of the first optical switching switch is connected to an input port of the pass-through dimension switching switch, a second output port of the first optical switching switch is connected to an input port of the wave-dropping wavelength switching switch, a first input port of the second optical switching switch is connected to an output port of the pass-through dimension switching switch, and a second input port of the second optical switching switch is connected to an output port of the wave-adding wavelength switching switch.

Optionally, in another embodiment, the node further includes a wave-dropping dimension switching switch, that the first optical signal is sent to the wave-dropping wavelength switching switch under the control of the processor 1401 may include the first optical switching switch sends the first optical signal to the wave-dropping dimension switching switch, and the wave-dropping dimension switching switch performs dimension switching on the first optical signal from the first optical switching switch, and sends, to the wave-dropping wavelength switching switch, the first optical signal that has undergone dimension switching.

A first output port of the first optical switching switch is connected to an input port of the pass-through dimension switching switch, a second output port of the first optical switching switch is connected to an input port of the wave-dropping dimension switching switch, an output port of the wave-dropping dimension switching switch is connected to an input port of the wave-dropping wavelength switching switch, a first input port of the second optical switching switch is connected to an output port of the pass-through dimension switching switch, and a second input port of the second optical switching switch is connected to an output port of the wave-adding wavelength switching switch.

Optionally, in another embodiment, the node further includes a wave-adding dimension switching switch, that the third optical signal that has undergone wavelength switching performed by the wave-adding wavelength switching switch is sent to the second optical switching switch under the control of the processor 1401 may include the wave-adding wavelength switching switch sends, to the wave-adding dimension switching switch, the third optical signal that has undergone wavelength switching performed by the wave-adding wavelength switching switch; and the wave-adding dimension switching switch performs dimension switching on the third optical signal that has undergone wavelength switching performed by the wave-adding wavelength switching switch, and sends, to the second optical switching switch, the third optical signal that has undergone dimension switching.

A first output port of the first optical switching switch is connected to an input port of the pass-through dimension switching switch, a second output port of the first optical switching switch is connected to an input port of the wave-dropping wavelength switching switch, a first input port of the second optical switching switch is connected to an output port of the pass-through dimension switching switch, a second input port of the second optical switching switch is connected to an output port of the wave-adding dimension switching switch, and an input port of the wave-adding dimension switching switch is connected to an output port of the wave-adding wavelength switching switch.

Optionally, in another embodiment, the node further includes a wave-adding dimension switching switch and a wave-dropping dimension switching switch, that the first optical signal is sent to the wave-dropping wavelength switching switch under the control of the processor 1401 may include the first optical switching switch sends the first optical signal to the wave-dropping dimension switching switch, and the wave-dropping dimension switching switch performs dimension switching on the first optical signal from the first optical switching switch, and sends, to the wave-dropping wavelength switching switch, the first optical signal that has undergone dimension switching. That the third optical signal that has undergone wavelength switching performed by the wave-adding wavelength switching switch is sent to the second optical switching switch may include the wave-adding wavelength switching switch sends, to the wave-adding dimension switching switch, the third optical signal that has undergone wavelength switching performed by the wave-adding wavelength switching switch, and the wave-adding dimension switching switch performs dimension switching on the third optical signal that has undergone wavelength switching performed by the wave-adding wavelength switching switch, and sends, to the second optical switching switch, the third optical signal that has undergone dimension switching.

A first output port of the first optical switching switch is connected to an input port of the pass-through dimension switching switch, a second output port of the first optical switching switch is connected to an input port of the wave-dropping dimension switching switch, an output port of the wave-dropping dimension switching switch is connected to an input port of the wave-dropping wavelength switching switch, a first input port of the second optical switching switch is connected to an output port of the pass-through dimension switching switch, a second input port of the second optical switching switch is connected to an output port of the wave-adding dimension switching switch, and an input port of the wave-adding dimension switching switch is connected to an output port of the wave-adding wavelength switching switch.

Optionally, in another embodiment, the first optical switching switch may be a 1×2 switch.

Optionally, in another embodiment, the second optical switching switch may be a 2×1 switch.

Optionally, in another embodiment, the node further includes a demultiplexer, a multiplexer, a wave-adding port switching switch, and a wave-dropping port switching switch. Under the control of the processor 1401, the demultiplexer demultiplexes a wavelength division multiplexing signal from a network node, and sends the optical signal obtained after demultiplexing to the first optical switching switch, where an output port of the demultiplexer is connected to an input port of the first optical switching switch. The multiplexer multiplexes the second optical signal from the second optical switching switch and the third optical signal from the second optical switching switch to obtain a wavelength division multiplexing signal, where an input port of the multiplexer is connected to an output port of the second optical switching switch. The wave-adding port switching switch performs division and port switching on an optical signal generated locally to obtain the third optical signal, and sends the third optical signal to the wave-adding wavelength switching switch, where an output port of the wave-adding port switching switch is connected to an input port of the wave-adding wavelength switching switch. The wave-dropping port switching switch performs division and port switching on the first optical signal that has undergone wavelength switching performed by the wave-dropping wavelength switching switch, where an input port of the wave-dropping port switching switch is connected to an output port of the wave-dropping wavelength switching switch.

In this embodiment of the present disclosure, two wavelength switching switches are respectively configured to perform wave adding on a wavelength of an optical signal generated locally and perform wave dropping on a wavelength of an optical signal sent by a network node. In this way, wave adding and wave dropping are performed separately, so as to avoid sharing one wavelength switching optical switch by wave adding and wave dropping, and reduce crosstalk in an optical cross-connect node.

In addition, a dimension switching switch is added for wave-dropping switching and/or a dimension switching switch is added for wave-adding switching, and selection flexibility of a wave-adding port and/or a wave-dropping port can be improved. In addition, dimension switching is performed independently of wave adding/dropping, and a pass-through wave does not need to pass through a wave-adding/dropping switching switch, so that the pass-through wave is not blocked, and a loss of the pass-through wave is reduced.

It should be understood that "an embodiment" or "an embodiment" mentioned in the whole specification does not mean that particular features, structures, or characteristics related to the embodiment are included in at least one embodiment of the present disclosure. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. The following provides an example but does not impose a limitation: The computer-readable medium may include a random access memory (RAM), a read-only memory (ROM), an electrically erasable programmable ROM (EEPROM), a compact disc ROM (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present disclosure includes a compact disc (CD), a laser disc, an optical disc, a digital versatile disc (DVD), a floppy disk and a Blu-ray disc. The disk generally copies data by a magnetic means, and the disc copies data optically by a laser means. The foregoing combination should also be included in the protection scope of the computer-readable medium.

In summary, what is described above is merely examples of embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. An optical cross-connect node, comprising:
a first optical switch configured to receive a first optical signal and a second optical signal;
a second optical switch;
a wave-dropping wavelength switch coupled to the first optical switch and configured to:
receive the first optical signal from the first optical switch; and
perform wavelength switching on the first optical signal to produce a switched first optical signal;
a wave-adding wavelength switch coupled to the second optical switch and configured to:
perform wavelength switching on a third optical signal to produce a switched third optical signal; and
send, to the second optical switch, the switched third optical signal; and
a pass-through dimension switch coupled to the first optical switch and the second optical switch and configured to:
receive the second optical signal from the first optical switch;
perform dimension switching on the second optical signal to produce a switched second optical signal; and
send, to the second optical switch, the switched second optical signal, and
the second optical switch being configured to output the switched second optical signal and the switched third optical signal.

2. The optical cross-connect node a of claim 1, wherein a first optical switch first output port is coupled to a pass-through dimension switch input port, a first optical switch second output port is coupled to a wave-dropping wavelength switch input port, a second optical switch first input port is coupled to a pass-through dimension switch output port, and a second optical switch second input port is coupled to a wave-adding wavelength switch output port.

3. The optical cross-connect node of claim 1, further comprising a wave-dropping dimension switch coupled to the first optical switch and the wave-dropping wavelength switch and configured to perform dimension switching on the first optical signal from the first optical switch to produce a switched fourth optical signal, the wave-dropping dimension switch being configured to send, to the wave-dropping wavelength switch, the switched fourth optical signal, a first optical switch first output port being coupled to a pass-through dimension switch input port, a first optical switch second output port being coupled to a wave-dropping dimension switch input port, a wave-dropping dimension switch output port being coupled to a wave-dropping wavelength switch input port, a second optical switch first input port being coupled to a pass-through dimension switch output port, and a second optical switch second input port being coupled to a wave-adding wavelength switch output port.

4. The optical cross-connect node of claim 1, further comprising a wave-adding dimension switch coupled to the wave-adding wavelength switch and the second optical switch and configured to perform dimension switching on the switched third optical signal, wherein the wave-adding dimension switch is configured to send, to the second optical switch, the switched third optical signal, a first optical switch first output port being coupled to a pass-through dimension switch input port, a first optical switch second output port being coupled to a wave-dropping wavelength switch input port, a second optical switch first input port being coupled to a pass-through dimension switch output port, a second optical switch second input port being coupled to a wave-adding dimension switch output port, and a wave-adding dimension switch input port being coupled to a wave-adding wavelength switch output port.

5. The optical cross-connect node of claim 1, further comprising:
   a wave-adding dimension switch coupled to the wave-adding wavelength switch and the second optical switch and configured to perform dimension switching on the switched third optical signal to produce a switched fourth optical signal and to send the switched fourth optical signal to the second optical switch; and
   a wave-dropping dimension switch coupled to the first optical switch and the wave-dropping wavelength switch and configured to perform dimension switching on the first optical signal from the first optical switch to produce a switched fifth optical signal and to send the switched fifth optical signal to the wave-dropping wavelength switch, a first optical switch first output port being coupled to a pass-through dimension switch input port, a first optical switch second output port being coupled to a wave-dropping dimension switch input port, a wave-dropping dimension switch output port being coupled to a wave-dropping wavelength switch input port, a second optical switch first input port being coupled to a pass-through dimension switch output port, a second optical switch second input port being coupled to a wave-adding dimension switch output port, and a wave-adding dimension switch input port being coupled to a wave-adding wavelength switch output port.

6. The optical cross-connect node of claim 1, wherein the first optical switch is a 1×2 switch.

7. The optical cross-connect node of claim 1, wherein the second optical switch is a 2×1 switch.

8. The optical cross-connect node of claim 1, further comprising:
   a demultiplexer comprising an output port coupled to a first optical switch output port, the demultiplexer configured to:
      demultiplex a wavelength division multiplexing signal from a network node to obtain a demultiplexed wavelength division multiplexing signal; and
      send the demultiplexed wavelength division multiplexing signal to the first optical switch,
   a multiplexer comprising an input port coupled to a second optical switch output port, the multiplexer being configured to multiplex the switched second optical signal from the second optical switch and the switched third optical signal from the second optical switch to obtain a wavelength division multiplexing signal;
   a wave-adding port switch comprising an output port coupled to a wave-adding wavelength switch input port, the wave-adding port switch configured to:
      perform division and port switching to obtain the third optical signal; and
      send the third optical signal to the wave-adding wavelength switch; and
   a wave-dropping port switch comprising an input port coupled to a wave-dropping wavelength switch output port, the wave-dropping port switch configured to perform division and port switching on the switched first optical signal.

9. An optical signal switching method implemented using a node that comprises a first optical switch coupled to a wave-dropping wavelength switch and a pass-through dimension switch, the node further comprising a second optical switch coupled to a wave-adding wavelength switch, and the method comprising:
   receiving, by the first optical switch, a first optical signal and a second optical signal;
   sending, by the first optical switch, the first optical signal to the wave-dropping wavelength switch;
   sending, by the first optical switch, the second optical signal to the pass-through dimension switch;
   performing, by the wave-dropping wavelength switch, wavelength switching on the first optical signal from the first optical switch to produce a switched first optical signal;
   performing, by the wave-adding wavelength switch, wavelength switching on a third optical signal to produce a switched third optical signal;
   sending, by the wave-dropping wavelength switch to the second optical switch, the switched third optical signal;
   performing, by the pass-through dimension switch, dimension switching on the second optical signal from the first optical switch to produce a switched second optical signal;
   sending, by the pass-through dimension switch to the second optical switch, the switched second optical signal;
   receiving, by the second optical switch, the switched second optical signal from the pass-through dimension switch and the switched third optical signal from the wave-adding wavelength switch; and
   outputting, by the second optical switch, the switched second optical signal from the pass-through dimension switch and the switched third optical signal from the wave-adding wavelength switch.

10. The method of claim 9, wherein a first optical switch first output port is coupled to pass-through dimension switch input port, a first optical switch second output port is coupled to a wave-dropping wavelength switch input port, a second optical switch first input port is coupled to a pass-through dimension switch output port, and a second optical switch second output port is coupled to a wave-adding wavelength switch output port.

11. The method of claim 9, wherein the node further comprises a wave-dropping dimension switch coupled to the first optical switch and the wave-dropping wavelength switch, and sending the first optical signal to the wave-dropping wavelength switch comprises:
   sending, by the first optical switch, the first optical signal to the wave-dropping dimension switch;
   performing, by the wave-dropping dimension switch, dimension switching on the first optical signal from the first optical switch to produce a switched fourth optical signal; and
   sending, to the wave-dropping wavelength switch, the switched fourth optical signal,
   a first optical switch first output port being coupled to a pass-through dimension switch input port, a first optical switch second output port being coupled to a wave-dropping dimension switch input port, a wave-dropping dimension switch being coupled to a wave-dropping wavelength switch input port, a second optical switch first input port being coupled to a pass-through dimension switch output port, and a second optical switch second output port being coupled to a wave-adding wavelength switch output port.

12. The method of claim 9, wherein the node further comprises a wave-adding dimension switch coupled to the wave-adding wavelength switch and the second optical switch, and sending, to the second optical switch, the switched third optical signal comprises:
- sending, by the wave-adding wavelength switch to the wave-adding dimension switch, the switched third optical signal;
- performing, by the wave-adding dimension switch, dimension switching on the switched third optical signal to produce a switched fourth optical signal; and
- sending, to the second optical switch, the switched fourth optical signal,
- a first optical switch first output port being coupled to a pass-through dimension switch input port, a first optical switch second output port being coupled to a wave-dropping wavelength switch input port, a second optical switch first input port being coupled to a pass-through dimension switch output port, a second optical switch second input port being coupled to a wave-adding dimension switch output port, and a wave-adding dimension switch input port being coupled to a wave-adding wavelength switch output port.

13. The method of claim 9, wherein the node further comprises:
- a wave-adding dimension switch coupled to the wave-adding wavelength switch and the second optical switch; and
- a wave-dropping dimension switch coupled to the first optical switch and the wave-dropping wavelength switch, and
- sending the first optical signal to the wave-dropping wavelength switch comprises:
  - sending, by the first optical switch, the first optical signal to the wave-dropping dimension switch;
  - performing, by the wave-dropping dimension switch, dimension switching on the first optical signal from the first optical switch to produce a switched fourth optical signal;
  - sending, to the wave-dropping wavelength switch, the switched fourth optical signal, and
  - sending, to the second optical switch, the switched third optical signal comprises:
    - sending, by the wave-adding wavelength switch to the wave-adding dimension switch, the switched third optical signal;
    - performing, by the wave-adding dimension switch, dimension switching on the switched third optical signal to produce a switched fifth optical signal; and
    - sending, to the second optical switch, the switched fifth optical signal,
- a first optical switch first output port being coupled to a pass-through dimension switch input port, a first optical switch second output port being coupled to a wave-dropping dimension switch input port, a wave-dropping dimension switch output port being coupled to a wave-dropping wavelength switch input port, a second optical switch first input port being coupled to a pass-through dimension switch output port, a second optical switch second input port being coupled to a wave-adding dimension switch output port, and a wave-adding dimension switch input port being coupled to a wave-adding wavelength switch output port.

14. The method of claim 9, wherein the first optical switch is a 1×2 switch.

15. The method of claim 9, wherein the second optical switch is a 2×1 switch.

16. The method of claim 9, wherein the node further comprises a demultiplexer, a multiplexer, a wave-adding port switch, and a wave-dropping port switch, and wherein the method further comprises:
- demultiplexing, by the demultiplexer, a wavelength division multiplexing signal from a network node;
- sending the optical signal obtained after demultiplexing to the first optical switch;
- multiplexing, by the multiplexer, the second optical signal from the second optical switch and the third optical signal from the second optical switch to obtain a wavelength division multiplexing signal;
- performing, by the wave-adding port switch, division and port switching to obtain the third optical signal;
- sending the third optical signal to the wave-adding wavelength switch; and
- performing, by the wave-dropping port switch, division and port switching on the switched first optical signal.

* * * * *

UNITED STATES PATENT AND TRADEMARK OFFICE
CERTIFICATE OF CORRECTION

PATENT NO. : 10,291,971 B2
APPLICATION NO. : 15/728751
DATED : May 14, 2019
INVENTOR(S) : Dawei Wang et al.

Page 1 of 1

It is certified that error appears in the above-identified patent and that said Letters Patent is hereby corrected as shown below:

In the Claims

Column 34, Line 38: "node a of" should read "node of"

Signed and Sealed this
Twenty-third Day of July, 2019

Andrei Iancu
*Director of the United States Patent and Trademark Office*